(12) United States Patent
Léonard

(10) Patent No.: US 10,902,088 B2
(45) Date of Patent: Jan. 26, 2021

(54) QUANTITATIVE ANALYSIS OF SIGNAL RELATED MEASUREMENTS FOR TRENDING AND PATTERN RECOGNITION

(71) Applicant: HYDRO-QUÉBEC, Montréal (CA)

(72) Inventor: François Léonard, Montréal (CA)

(73) Assignee: HYDRO-QUÉBEC, Quebec (CA)

( * ) Notice: Subject to any disclaimer, the term of this patent is extended or adjusted under 35 U.S.C. 154(b) by 714 days.

(21) Appl. No.: 14/888,804

(22) PCT Filed: Apr. 17, 2014

(86) PCT No.: PCT/CA2014/050388
§ 371 (c)(1),
(2) Date: Nov. 3, 2015

(87) PCT Pub. No.: WO2014/179873
PCT Pub. Date: Nov. 13, 2014

(65) Prior Publication Data
US 2016/0085725 A1    Mar. 24, 2016

(30) Foreign Application Priority Data

May 6, 2013    (CA) .................................... 2815161

(51) Int. Cl.
*G06F 17/18*    (2006.01)
*G06K 9/00*    (2006.01)
*G06K 9/62*    (2006.01)

(52) U.S. Cl.
CPC ......... *G06F 17/18* (2013.01); *G06K 9/00536* (2013.01); *G06K 9/6243* (2013.01); *G06K 9/6252* (2013.01); *G06K 9/6272* (2013.01)

(58) Field of Classification Search
CPC .... G06F 17/18; G06K 9/6252; G06K 9/6272; G06K 9/00536; G06K 9/6243
See application file for complete search history.

(56) References Cited

U.S. PATENT DOCUMENTS 4,081,830 A    3/1978    Mick et al.
4,937,763 A    6/1990    Mott
(Continued)

FOREIGN PATENT DOCUMENTS

CA    2741202    11/2012
EP    2 333 629 A1    6/2011

OTHER PUBLICATIONS

Applicant response dated Mar. 10, 2017 in Patent application (Euro-PCT) No. 14795019.0 filed on Apr. 17, 2014 Regional phase of International Application PCT/CA2014/050388 Priority: CA n °2,815,161 filed on May 6, 2013 in the name of HYDRO QUEBEC.*

(Continued)

*Primary Examiner* — Alexander Satanovsky
*Assistant Examiner* — Mark I Crohn
(74) *Attorney, Agent, or Firm* — Muirhead and Saturnelli, LLC

(57) ABSTRACT

A computerized method for quantitative analysis of signal related measurements, performed with one or more processors, is disclosed. An estimated signature typifying a characteristic feature of the signal related measurements is produced. Multidimensional statistics on the signal related measurements are computed in a multidimensional space with respect to the estimated signature. Matching likelihoods of the signal related measurements are quantified based on distances of the signal related measurements with respect to a shell manifold derived from the multidimensional statistics and enveloping a signature manifold in the multidimensional space. Multidimensional statistics on the estimated signature and trending and pattern recognition are also possible from the signal multidimensional projection.

29 Claims, 11 Drawing Sheets

(56) References Cited

U.S. PATENT DOCUMENTS

| | | |
|---|---|---|
| 5,253,070 A | 10/1993 | Hong |
| 5,649,068 A | 7/1997 | Boser et al. |
| 6,278,962 B1 | 8/2001 | Klimasauskas et al. |
| 6,522,978 B1 | 2/2003 | Chen et al. |
| 6,671,625 B1 | 12/2003 | Gulati |
| 7,034,738 B1 | 4/2006 | Wang et al. |
| 7,356,415 B1 | 4/2008 | Pitman et al. |
| 7,606,403 B2 | 10/2009 | Haussecker et al. |
| 8,065,092 B2 | 11/2011 | Khan et al. |
| 8,126,664 B2 | 2/2012 | Fournier et al. |
| 8,200,440 B2 | 6/2012 | Hubbell et al. |
| 8,224,029 B2 | 7/2012 | Saptharishi et al. |
| 8,239,170 B2 | 8/2012 | Wegerich |
| 8,250,006 B2 | 8/2012 | Smits et al. |
| 8,280,839 B2 | 10/2012 | Ivanov et al. |
| 8,311,774 B2 | 11/2012 | Hines |
| 2002/0057840 A1 | 5/2002 | Belmares |
| 2013/0031019 A1 | 1/2013 | Herzog |

OTHER PUBLICATIONS

S. Jaiyen, et al., "Non-Euclidean Self-Organizing Classification Using Natural Manifold Distance," Neural Networks, 2004, Proceedings, 2004 IEEE International Joint Conference, vol. 1, IEEE, 2004, pp. 799-802.

R. Krishnapuram, et al., "Fuzzy and Possibilistic Shell Clustering Algorithms and Their Application to Boundary Detection and Surface Approximation—Part I", IEEE Transactions on Fuzzy Systems, vol. 3, No. 1, Feb. 1995, pp. 29-43.

B. Tso, et al., "Classification Methods for Remotely Sensed Data," 2001, ISBN 0-415-25908-8 (hb), ISBN 0-415-25909-6 (pk), pp. 68-79.

\* cited by examiner

QUANTITATIVE ANALYSIS OF SIGNAL RELATED MEASUREMENTS FOR TRENDING AND PATTERN RECOGNITION

FIELD OF THE INVENTION

The invention relates to a computerized method for quantitative analysis of signal related measurements, for example for trending and pattern recognition to monitor an operating state of an apparatus or equipment.

BACKGROUND

Most of trending and matching algorithms consider additive noise at the first level: the measurement is processed one-dimensionally where the noise is a random amount added for each signal sample, instead of processing measurements as a sum of signal vector and noise vector. Better results are obtained when considering a statistical modelling of signal and noise. A deeper step is a process modeling which allows a monitoring of internal process parameters. WO 2012/162825 (Léonard) proposes a dynamic time clustering involving static signature discrimination using a projection of the measurement as the sum of signal and noise vectors in a multidimensional space $\mathbb{R}^N$. However, quantitative analysis of the signals is limited and pattern recognition of a signature and moving signature conditions are not addressed.

In the field of process trending, many monitoring algorithms use envelopes (continuous) or bands (discrete) alarms that generate an alarm when exceeded. Manual adjustment appears difficult and inaccurate. Self-adjustment of alarm levels is greatly desired to increase robustness and sensitivity and to facilitate implementation. Mostly, the methods only consider the greatest excess to raise an alarm. The alarm level is typically set high in order to avoid "false positive" indications generated by random noise. This setting reduces the sensitivity and increases the probability of "false negative" indications (defect missed). Moreover, several small differences below the alarm level can be as problematic as one large excursion on a small portion outside the alarm limit "False positive" indications in trending and pattern recognition appear to be a great concern. The following patents only partially overcome these problems. U.S. Pat. No. 8,239,170 (Wegerich) proposes a method for detection of state changes, or for signature recognition and classification. Wavelet analysis, frequency band filtering or other methods may be used to decompose the signal into components. The decomposed signal is compared with a library signature. The recognized signature indicates data being carried in the signal. U.S. Pat. No. 6,522,978 (Chen et al.) proposes a method for predicting web breaks in a paper machine Principal components analysis and classification and regression tree modeling are used to predict web break sensitivity from measurements. U.S. Pat. No. 6,278,962 (Klimasauskas et al.) proposes a hybrid analyzer using a linear model with a trained neural network model to predict the process variables. U.S. Pat. No. 4,937,763 (Mott) proposes the monitoring of a multi-variable process by comparing observations acquired when the system is running in an acceptable state with current observations acquired at periodic intervals thereafter to determine if the process is currently running in an acceptable state. U.S. Pat. No. 8,250,006 (Smits et al.) proposes a predictive algorithm using a genetic programming technique that evolves a population of candidate algorithms through multiple generations. The predictive algorithm may be implemented in an inferential sensor that is used to monitor a physical, chemical, or biological process, such as an industrial process in an industrial plant.

In the field of image processing, U.S. Pat. No. 5,253,070 (Hong) proposes a hardware circuit for automatically detecting a variation of video information where the currently inputted video data is compare with the stored video data to detect a portion different from each other as the variation of video information. U.S. Pat. No. 4,081,830 (Mick et al.) proposes a motion and intrusion detection system which stores information concerning fixed scanned points. During subsequent scans, information concerning the respective scanned points is compared with previous scans and threshold conditions are set up in order to detect an alarm condition. US 2002/0057840 (Belmares, Robert J.) proposes a method for monitoring a field of view for visible changes using image digital processing. U.S. Pat. No. 8,224,029 (Saptharishi et al.) proposes a camera system comprising an image capturing device, an object detection module, an object tracking module and a match classifier. The match classifier determines whether the selected object image signature matches the first object image signature. A training process automatically configures the match classifier.

In the field of identification of molecular structures, U.S. Pat. No. 7,606,403 (Haussecker et al.) proposes a capture of a plurality of images of one or more subjects using different imaging techniques, followed by parameters estimation from the plurality of images, using one or more models of known molecular structures to provide a model-based analysis. U.S. Pat. No. 8,200,440 (Hubbell et al.) proposes a method of analyzing data from processed images of biological probe arrays where a cluster corresponds to different genotypes using a Gaussian cluster model. U.S. Pat. No. 7,356,415 (Pitman et al.) proposes a method in a data processing system for generating and storing in a database descriptor vectors and reference frames for at least one region of a molecule. For each particular subset of component vectors, the method calculates a probability value for the F-distributed statistic associated with the particular subset, identifies the subset of component vectors associated with the selected probability value and generates a mapping to a space corresponding to the subset. In U.S. Pat. No. 6,671,625 (Gulati), a dot spectrogram is analyzed using clustering software to generate a gene array amplitude pattern representative of mutations of interest.

In the field of medical condition evaluation, U.S. Pat. No. 8,065,092 (Khan et al.) proposes a method based on high experimental dimensional data using training and supervised pattern recognition to determine if an unknown set of experimental data indicates a disease condition, a predilection for a disease condition, or a prognosis about a disease condition.

In the field of radar, U.S. Pat. No. 7,034,738 (Wang et al.) proposes a method for classifying radar emitters by sorting multi-dimensional samples into a plurality of data clusters based on their respective proximity to the data clusters, each data cluster representing a classification of a radar emitter.

In the field of financial predictions, US 2013/0031019 (Herzog; James Paul) proposes a monitoring system for determining the future behavior of a financial system. An empirical model module is configured to receive reference data that indicate the normal behavior of the system, and processes pattern arrays in order to generate estimate values based on a calculation that uses an input pattern array and the reference data to determine a similarity measure.

SUMMARY

An object of the invention is to provide a computerized method for quantitative analysis of signal related measurements which addresses the above shortcomings of the prior art.

Another object of the invention is to provide such a method which may be used for trending and pattern recognition and may achieve pattern recognition of a signature and handle moving signature conditions in order to track a signature evolving for example in response to a change in the operating state of an apparatus or relating to a way in which the signal measurements are taken.

Another object of the invention is to provide such a method which may continuously adjust alarm bounds and sensitivity and may consider simultaneously in a single criterion all deviations for all signal related measurements.

According to an aspect of the invention, there is provided a computerized method for quantitative analysis of signal related measurements, the method comprising the steps of, performed with one or more processors:

producing an estimated signature typifying a characteristic feature of the signal related measurements;

computing multidimensional statistics on the signal related measurements in a multidimensional space with respect to the estimated signature; and quantifying matching likelihoods of the signal related measurements based on distances of the signal related measurements with respect to a shell manifold derived from the multidimensional statistics and enveloping a signature manifold in the multidimensional space.

The method of the invention may be performed on a computer or a microcontroller having one or more processors and other devices, peripherals and accessories such as one or more memories, an I/O card, a display, etc.

According to another aspect of the invention, there is provided a system for monitoring an operating condition of an apparatus, comprising:

a measuring arrangement connectable to the apparatus, the measuring arrangement being configured to measure one or more predetermined operating parameters of the apparatus and produce signal related measurements thereof;

a memory having a statistics database;

a processor connected to the measuring arrangement and the memory, the processor being configured to process the signal related measurements, produce multidimensional statistics on the signal related measurements and an estimated signature typifying a characteristic feature of the signal related measurements, updating the statistics database with the signal related measurements and the multidimensional statistics, and produce diagnosis data indicative of the operating condition of the apparatus as function of matching likelihoods of the signal related measurements quantified based on distances of the signal related measurements with respect to a shell manifold derived from the multidimensional statistics and enveloping a signature manifold in the multidimensional space; and an output unit connected to the processor for externally reporting the diagnosis data.

BRIEF DESCRIPTION OF THE DRAWINGS

A detailed description of preferred embodiments will be given herein below with reference to the following drawings.

DETAILED DESCRIPTION OF THE PREFERRED EMBODIMENTS

As used in connection with this disclosure, the term "signal related measurements" refers to measurements derived from signals or samples of signals measured in respect with one or more like apparatuses (e.g. with sensors) or other kinds of signal sources and exhibiting possible noise and a characteristic sequence repeatable from one measurement to another and defining a signature. Most of the non-repeatable part of the measurements comes from the measured phenomenon intrinsic random contribution, ambient noise, the measurement system noise and the temporal evolution of the phenomenon between the measurements. The method according to the invention enables detecting and quantifying variations of the measurements with respect to a signature, variations of a signature with respect to an initial signature, and a matching likelihood of a signature or a measurement with a specific signature pattern.

In an embodiment of the method according to the invention, a signal related measurement is projected in a multi-dimensional space $\mathbb{R}^N$ where noise appears as a single vector with a length and a direction for a given set of signal measurements. The method considers a total noise dispersion in $\mathbb{R}^N$ instead of a sample-to-sample local noise dispersion. Projection of a N samples signal in a multidimensional space $\mathbb{R}^N$ for several realizations of measurement gives a distribution close to a hypersphere of radius r where r corresponds to a statistical average of measurement dispersion. At a center of the hypersphere is located an average signature. A boundary of the hypersphere has a thickness called hardness. The measurement population, the measurement dispersion and the number N of dimensions fix a standard deviation of the signature and the hypersphere thickness. The signature and hypersphere thickness values are estimated by the method according to the invention and used to scale up a deviation amplitude between the measurements. In the case of a large number of dimensions, a measurement distance with respect to the hypersphere shell density probability function converges to a Laplace-Gauss modeling and yields an analytical statistical formulation for a measurement likelihood.

Figure 15:
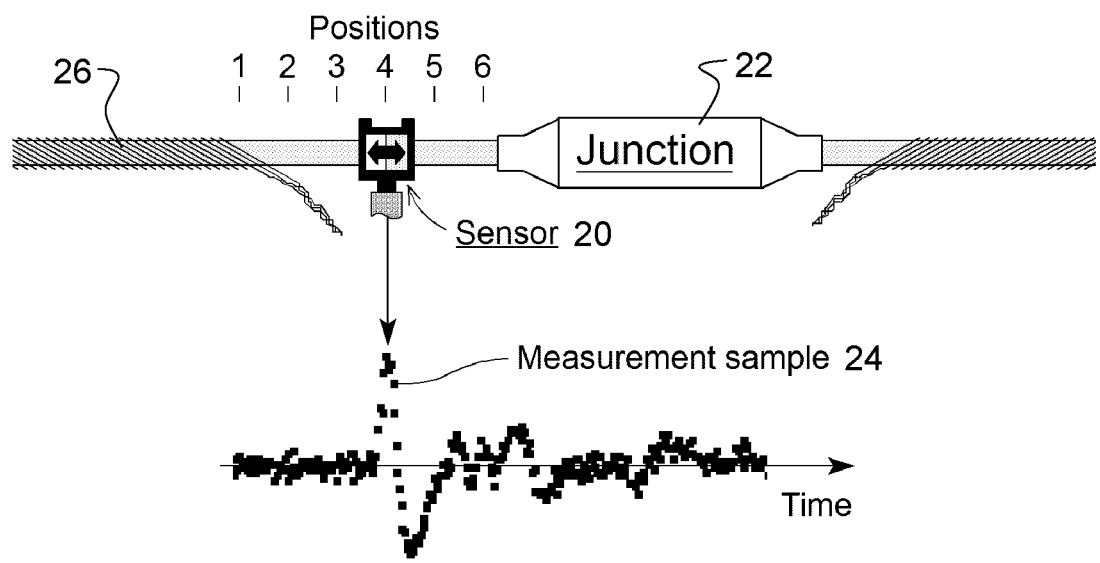
FIG. 15 is a schematic diagram illustrating an exemplary embodiment of the invention where a sensor is moved in the vicinity of a dielectric defect in a high-voltage junction.
Figure 16A:
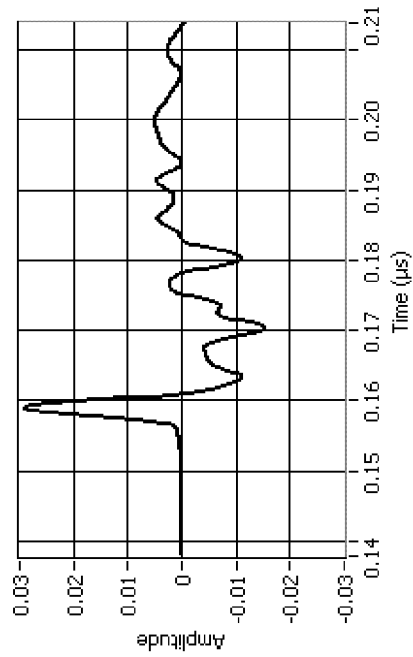
FIGS. 16A, 16B, 16C, 16D, 16E and 16F are graphs illustrating a spatial evolution of a partial discharge signature derived from a measuring and processing of measurement samples from the sensor of FIG. 14 according to the method of the invention.
Figure 16B:
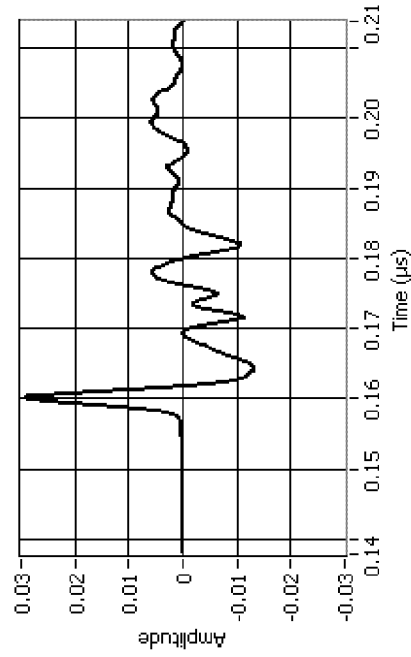
Figure 16C:
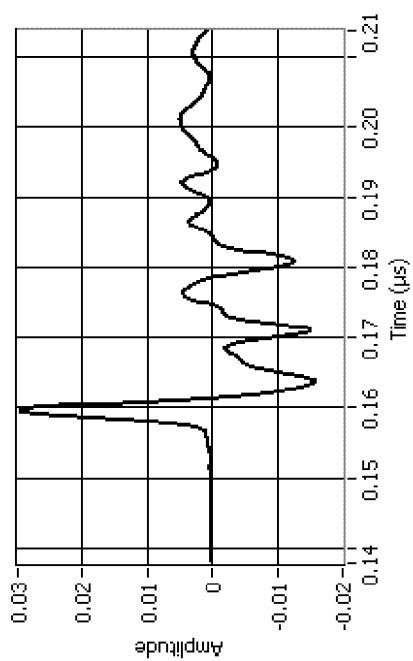
Figure 16D:
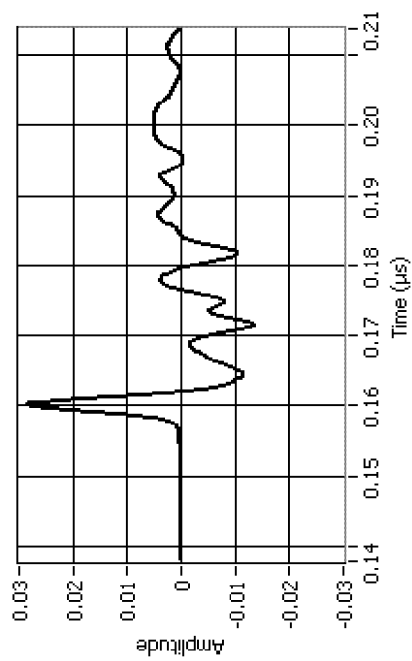
Figure 16E:
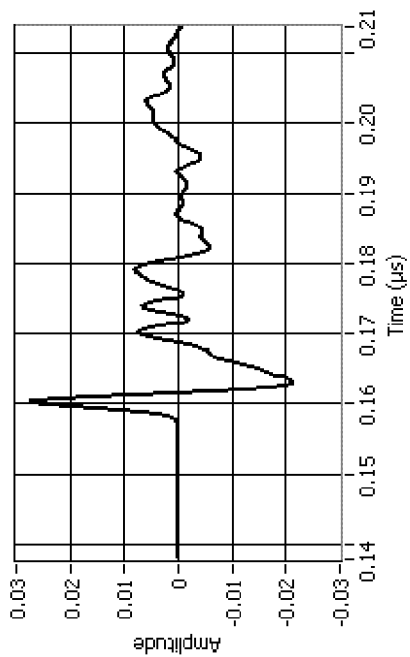
Figure 16F:
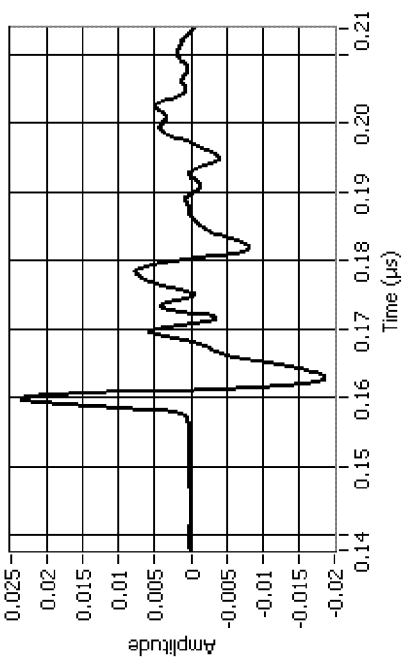

In the method according to the invention, evolution of a signature can be idle to slow, progressive or sudden. In an embodiment in respect with high voltage accessories partial discharge (PD) location in underground vault, displacement of a PD sensor shows a PD signature evolution as fast as the displacement is made. In such a case, if the sensor is moved back, the initial signature is found again. Pattern matching recognition is used to compare each evolution step of the PD signature with a reference signature corresponding to a known defect. In another PD domain embodiment in respect with PD monitoring of high voltage equipment in a substation, the method of the invention may be used to track an evolution of PD related to an insulation defect. FIG. 15 shows an exemplary embodiment of the invention in such a context. A sensor 20 is moved in the vicinity of a dielectric defect in a high-voltage junction 22. The sensor 20 may advantageously be formed of an electromagnetic "sniffer" as disclosed in U.S. Pat. No. 8,126,664 (Fournier et al.). A measurement sample 24 derived from signal measuring and processing from the sensor 20 at position 4 is shown in the figure. Positions 1 to 6 may for example correspond to a 3 cm (approximately) shift of the sensor 20 along a cable 26 connected to the junction 22. FIGS. 16A, 16B, 16C, 16D, 16E and 16F illustrate a spatial evolution of a partial discharge signature derived from a processing of measurement samples taken with the sensor 20 at respective positions 1, 2, 3, 4, 5 and 6 (shown in FIG. 15) according to the method of the invention. Each one of FIGS. 16A, 16B, 16C, 16D, 16E and 16F represents an evolution step of the signature. In another embodiment in respect with vibro-acoustic monitoring of equipments, the method of the invention may compare a new vibro-acoustic measurement with a moving average (MA) signature and compare the MA signature with an initial signature. In an embodiment in respect with a rotating machinery, a measurement processed with the method of the invention may be an order power spectrum of a signal produced by a sensor located on a rotating equipment or a concatenation of a plurality of power spectrum corresponding to different locations on the same rotating equipment. In process monitoring, e.g. chemical or manufacturing, the method of the invention may be used to monitor the process and diagnose emerging fault. In image processing, a new image may be compared with an image signature to detect motion. If there is a database of signatures related to a confirmed diagnosis, the method of the invention may be used for pattern recognition, e.g. match a current signature with a previous signature stored in the database in order to provide a diagnostic and a corresponding likelihood.

Figure 1:
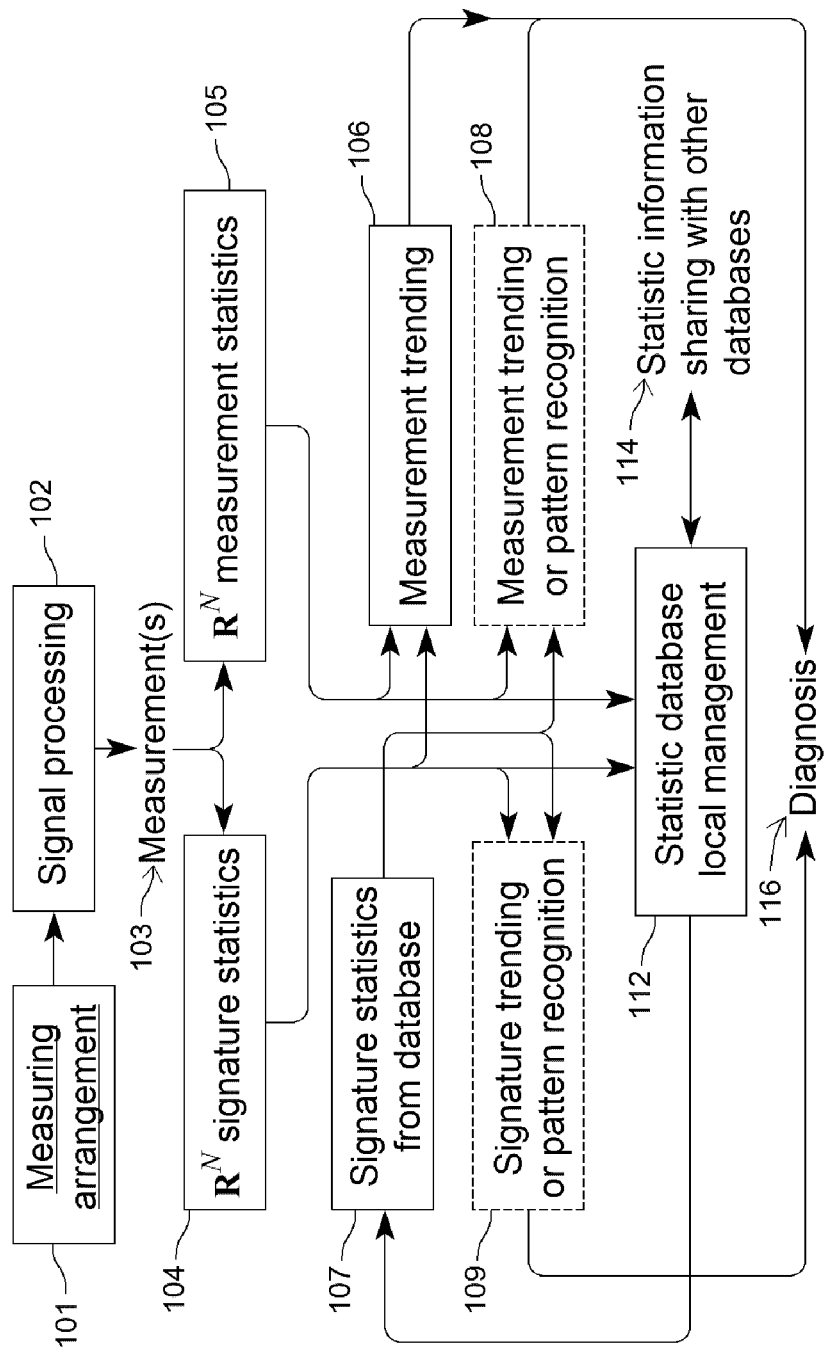
FIG. 1 is a schematic diagram illustrating components and functions of the method according to an embodiment of the invention.
Figure 2:
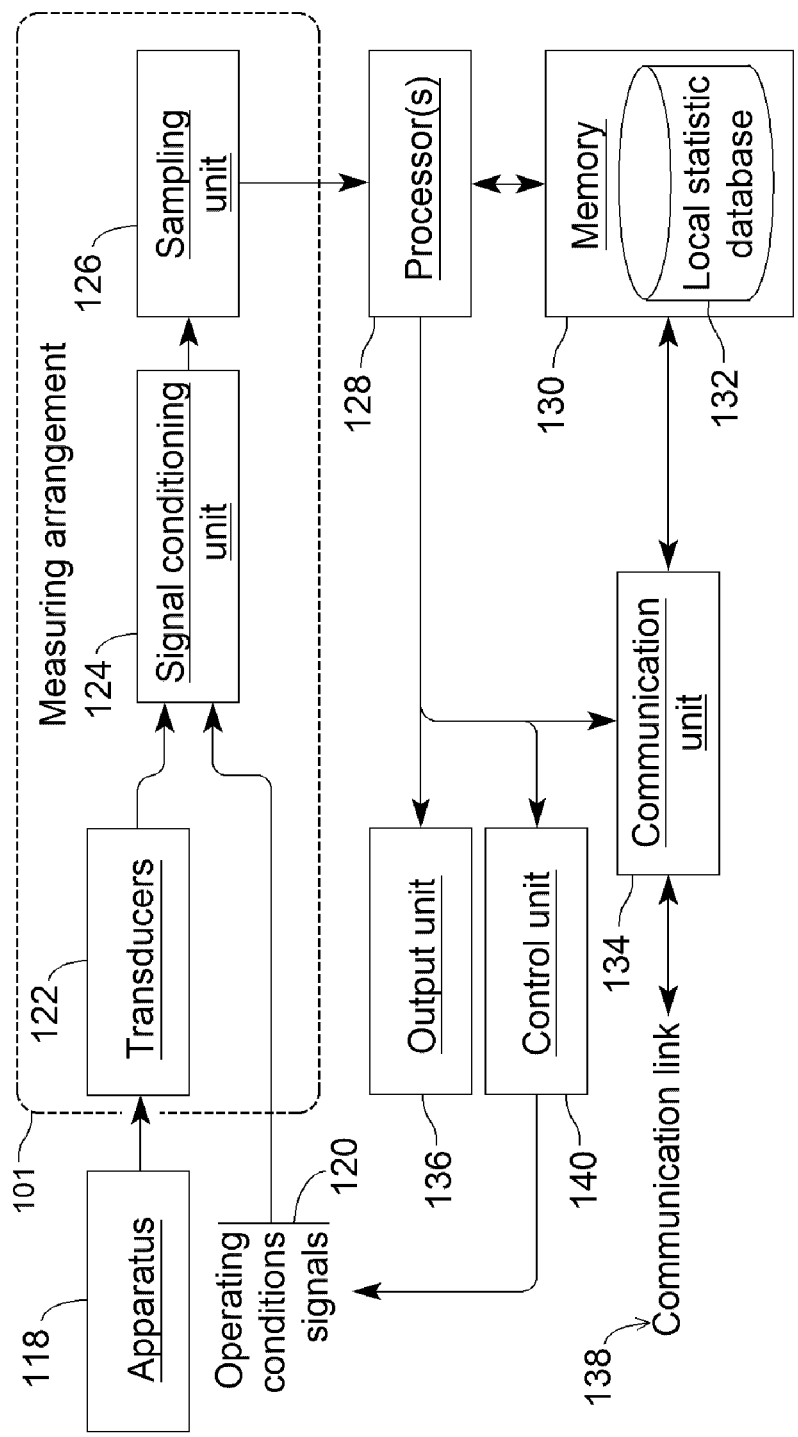
FIG. 2 is a schematic diagram illustrating a system monitoring operating conditions of an apparatus according to an embodiment of the invention.
Figure 11:
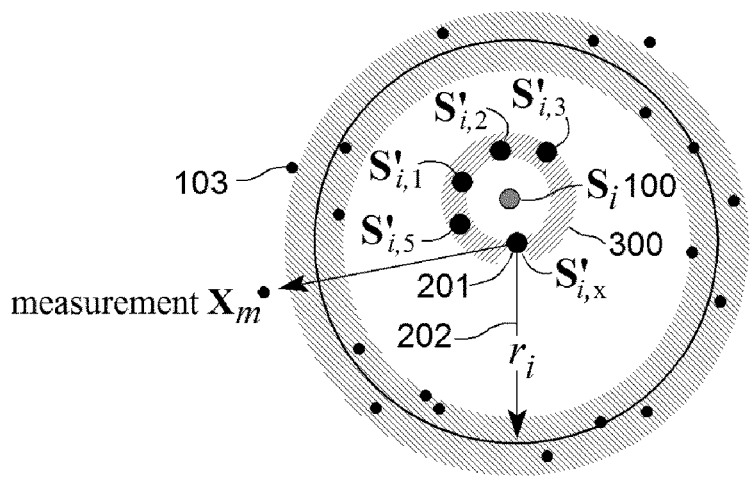
FIG. 11 is a schematic diagram providing a N-dimensional illustration of a measurement cluster and a corresponding estimated signature $S'_{i,x}$ at different evolution steps.

Referring to FIG. 1, a measuring arrangement (or system) 101 produces one or more signals. As used in connection with this disclosure, the terms "measurement" and "signal related measurement" 103 represent a result of a signal processing 102 applied on a signal as produced by the measuring arrangement 101. For example, the measurement 103 may be a time series, an envelope, a power spectrum, a scalogram, a spectrogram, a 2D image, etc. Blocks (or modules) 104 and 105 respectively depict computation of multidimensional statistics on the estimated signature (or signature related data) and on the signal related measurements in a multidimensional space $\mathbb{R}^N$. In the $\mathbb{R}^N$ signature statistics 104, many measurements may be averaged to generate the "estimated signature" and to generate some statistical indicators characterizing a $\mathbb{R}^N$ cluster measurement dispersion. Many measurements may be related to more than one estimated signature. The case of dynamically clustering measurements to many signatures is treated in WO 2012/162825 (Léonard). When considering one signature 100 (as shown in FIG. 11) and many corresponding measurements, the $\mathbb{R}^N$ measurement statistics 105 may be calculated for an individual measurement, usually the last measurement. Block (or module) 106 depicts computation of a measurement trending from the $\mathbb{R}^N$ measurement statistics 105 and the $\mathbb{R}^N$ signature statistics 104. Block (or module) 108 depicts computation of measurement trending or pattern recognition from the $\mathbb{R}^N$ measurement statistics 105 and signature statistics that may be stored in a database as depicted by block 107. For example, when the measurement trending 106 exhibits a significant deviation with respect to a signature, some pattern recognitions 108 are performed for a set of signatures stored in a database 107 that may be characteristic of documented equipment failures. Block (or module) 109 depicts computation of signature trending or pattern recognition from the $\mathbb{R}^N$ signature statistics 104 and the database stored signature statistics 107. In the signature trending 109, a signature comparison is computed between the updated signature statistics 104 and a former signature statistic 107. When the signature trending 109 exhibits a significant deviation, some pattern recognitions 109 are performed for a set e.g. of signatures stored in the database. The trending and/or pattern recognition outputs of blocks 106, 108 and 109 may be used to produce a diagnosis 116 which may take the form of diagnosis data indicative for example of a current alarm state or other operating conditions of an apparatus 118 (as shown in FIG. 2), possibly displayed and/or transmitted to other systems. The $\mathbb{R}^N$ signature statistics 104 and the $\mathbb{R}^N$ measurement statistics 105 are collected by the statistic database local management module 112 which updates the statistic information in the local database 132 and possibly transfers the information to other databases. The local statistic database 132 may contain information about local cumulated measurements and information coming from systems which monitor similar apparatuses. For example, in the case of identical apparatuses located in different countries which are subjected to various climates, merging the apparatus response for different operation temperatures may be used to get a picture of the typical signature over a larger temperature range. The statistic database local management 112 may share the statistic information with other databases 114. The sharing can be enabled at predetermined time intervals or when significant new information is available.

The merging process of the apparatus responses cumulated by different systems must take into account the similarities between the apparatus responses. Moreover, the cumulated measurements on a defective apparatus should not be merged with a database of a healthy apparatus. One task of the statistic database local management 112 may be to select the appropriate information to complete an unknown part of the apparatus response statistics 104, 105. There is a compromise between a hole in the local database and inconsistencies resulting from the merging of some inappropriate data.

Referring to FIG. 2, there is shown an embodiment of a system for monitoring an operating condition of an apparatus 118. A measuring arrangement 101 connectable to the apparatus 118 measures one or more predetermined operating parameters of the apparatus 118 and produces signal related measurements from them. The measuring arrangement 101 may have one or more transducers 122 connected to a sampling unit 126 through a signal conditioning unit 124. The signal conditioning unit 124 may have an input for receiving operating condition signals 120 in respect with the apparatus 118. The signal conditioning unit 124 may be such as to accept analog and digital input signals and may include electrical protection, analog filtering, amplification and envelop demodulation. The sampling unit 126 is intended to convert any analog signal into a digital signal and may add time stamps to the sampled signals which are then transmitted to a processor 128 (or many processors interconnected and operating together) connected to the measuring arrangement 101 and a memory 130 having a statistics database 132. The $\mathbb{R}_N$ signature statistics 104, the $\mathbb{R}^N$ measurement statistics 105, the measurement trending 106, the measurement trending or pattern recognition 108, the signature trending or pattern recognition 109 and the statistical database local management 112 may be embodied by the processor 128 in programmed form or otherwise, i.e. in electronic form depending on the design of the processor 128. The processor 128 may store and read data in the memory 130 that contains the local statistics database 132. The processor 128 is thus configured to process the signal related measurements, produce multidimensional statistics on the signal related measurements and an estimated signature typifying a characteristic feature of the signal related measurements, update the statistics database 132 with the signal related measurements and the multidimensional statistics, and produce diagnosis data indicative of the operating condition of the apparatus 118 as function of matching likelihoods of the signal related measurements quantified based on distances of the signal related measurements with respect to a shell manifold derived from the multidimensional statistics and enveloping a signature manifold in the multidimensional space, as it will be described with further details hereinafter. The processor 128 may transmit the diagnosis data 116 to an output unit 136 such as a display or printer connected to it for externally reporting the diagnosis data and to other systems monitoring like apparatuses through a communication unit 134 connected to the processor 128 and the memory 132 and connectable to a communication link 138 with the other systems for exchanging data with them. A control unit 140 connected to the processor 128 and the measuring arrangement 101 and connectable to the apparatus 118 may produce control signals for the apparatus 118 as function of control data produced by the processor 128 based on the diagnosis data. The processor 128 may then have a control module (in programmed or electronic form) for example producing a new control setting point in response to alarm state data in the diagnosis data 116, the new control setting point being transmitted to the apparatus 118 through the control unit 140. The alarm state data may be derived from the measurement trending, the measurement trending or pattern recognition and the signature trending or pattern recognition modules 106, 108, 109 (as shown in FIG. 1) and be indicative of an abnormal operating state of the apparatus 118 as it will be further described hereinafter.

Figure 3:
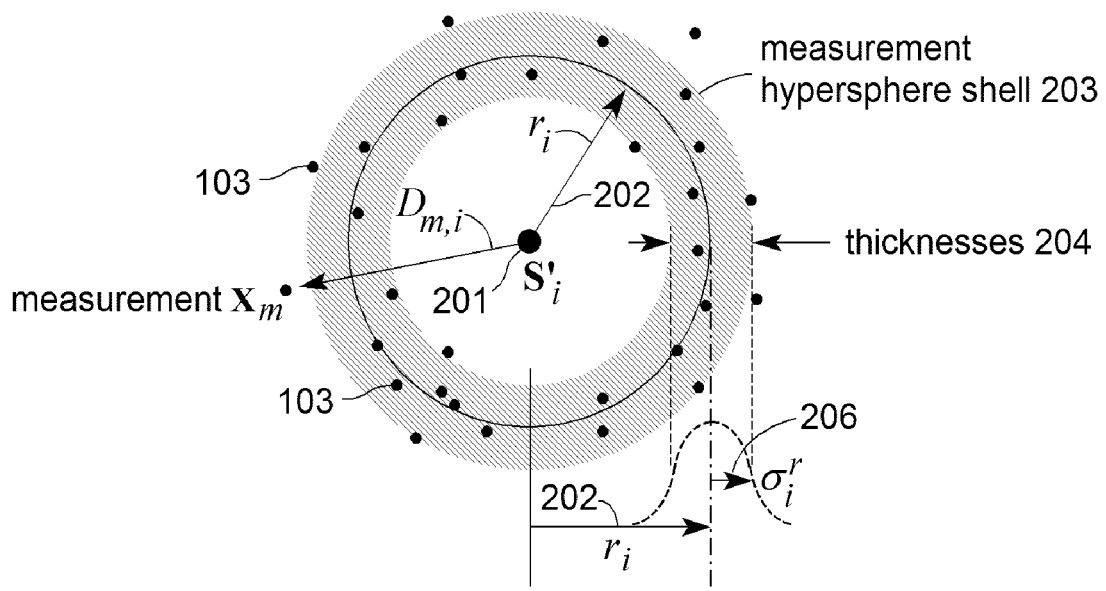
FIG. 3 is a schematic diagram providing a N-dimensional illustration of a measurement cluster and a corresponding signature.

Referring to FIG. 3, for a signature $S_i$ 100 (as shown in FIG. 11), assuming a repetitive pattern signature $S_{i,n}$ over different noise realizations where "n" is a subscript corresponding typically to time, frequency, wavelet scale or component order, let's consider a N samples measurement $$X_{m,n}=S_{i,n}+n_{m,n}, n\in[1,N] \tag{1}$$

where $n_{mn}$ is the additive noise and "m" a subscript of the measurement realization. Assuming a noise having a density probability function centered and many measurements 103 of a same $S_{i,n}$ pattern, a $\mathbb{R}^N$ projection of the measurements exhibits a cluster centered on a point of $\mathbb{R}^N$ corresponding to the "i" signature estimate 201

$$S'_i=\{S'_{i,1},S'_{i,2},\ldots,S'_{i,N}\} \tag{2}$$

where the measurements 103

$$X_m=\{X_{m,1},X_{m,2},\ldots,X_{m,N}\} \tag{3}$$

are distributed close to a hypersphere shell 203. Among different averaging options, a signature $S_i$ may be estimated from a M measurements set using a uniform average $$S_i \cong S'_i = \frac{1}{M}\sum_{m=1}^{M} X_m. \tag{4}$$

This signature estimation forms a first part of the "$\mathbb{R}^N$ signature statistics" 104 (as shown in FIG. 1). In some trending applications, an updated estimated signature 201 and other estimations are generated by a moving average process. Uniform average is presented here to keep the mathematical expressions short.

Figure 4:
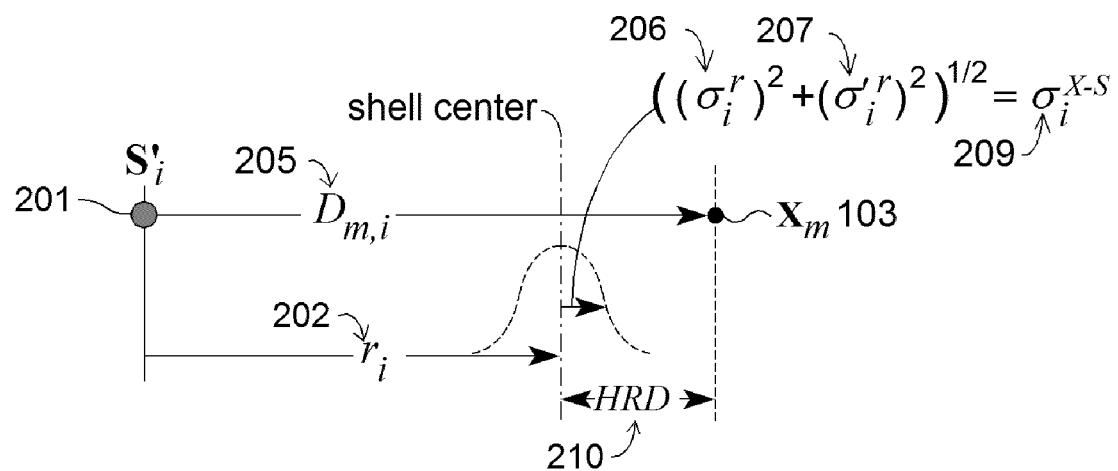
FIG. 4 is a schematic diagram illustrating a measurement $X_m$, an estimated signature $S'_i$ and their respective distance $D_{m,i}$ with measurement dispersion and hypersphere radius deviation (HRD) amplitude.

Referring to FIG. 4, for example for an Euclidian metric with uniform averaging, the measurement to estimated signature distance 205

$$D_{m,i}=\|X_m-S'_i\|=\sqrt{\sum_{n=1}^{N}(X_{m,n}-S'_{i,n})^2} \tag{5}$$

has an expected mean for a M measurements set. This set exhibits a cluster centered on the estimated signature 201, not on the real signature. The estimated signature 201 appears in eq. 5 for two reasons. First, the real signature is unknown and, second, an internal error of the signature estimation must not appear at this step. Using eq. 5, an expected mean distance $$r_i = \frac{1}{M}\sum_{m=1}^{M} D_{m,i} = \frac{1}{M}\sum_{m=1}^{M}\sqrt{\sum_{n=1}^{N}(X_{m,n}-S'_{i,n})^2} \text{ for } X_m \in \text{cluster ``}i\text{''}, \quad (6a)$$

or (possibly less accurate)

$$r_i = \sqrt{\frac{1}{M}\sum_{m=1}^{M} D_{m,i}^2} = \sqrt{\frac{1}{M}\sum_{m=1}^{M}\sum_{n=1}^{N}(X_{m,n}-S'_{i,n})^2} \text{ for } X_m \in \text{cluster ``}i\text{''}, \quad (6b)$$

appears close to the noise vector length expectation $\sqrt{NE(n_{m,n}^2)}$ where E ( ) is the expectation function. $S'_{i,n}$ is a closest point of the estimated signature with respect to $X_{m,n}$, N representing a number of dimensions related to a representation form of the signal related measurements, M representing a number of signal related measurements $X_m$ 103, and $S'_i$ 201 representing the estimated signature produced in relation with a cluster i to which the signal related measurements belong. This estimation ($r_i$) will be referred to as measurement hypersphere radius 202. The double of the expected measurement standard deviation 206 of the measurement distribution relative to hypersphere shell calculated with $$\sigma_i^r = \sqrt{\frac{1}{M}\sum_{m=1}^{M}\left(r_i - \sqrt{\sum_{n=1}^{N}(X_{m,n}-S_{i,n})^2}\right)^2} \quad (7a)$$

from measurements or estimated with $$\sigma_i^r = r_i \cdot \sqrt{\frac{1}{2N}} \quad \text{(Gaussian white noise assumption)} \quad (7b)$$

from the estimated radius length will be referred to as thickness 204 (as shown in FIG. 3). In the case of Gaussian white noise, the estimated dispersion given with eq. 7b appears with less dispersion than that calculated with eq. 7a. The accuracy of the measurement standard deviation 206 increases with the number M of measurement realizations. For a small M number, the estimation error on the standard deviation, i.e. the dispersion of measurement-to-shell dispersion 207

$$(\sigma_i'^r)^2 = \frac{\sigma_i^{r2}}{M-1} \text{ or } \sigma_i'^r = r_i \cdot \sqrt{\frac{1}{2N\cdot(M-1)}} \quad \text{(Gaussian white noise assumption)} \quad (8)$$

should be also taken into account.

Referring back to FIG. 3, the measurement hypersphere radius $r_i$ 202 and shell thickness $2\cdot\sigma_i^r$ 204 are illustrated in $\mathbb{R}^N$. The $\mathbb{R}^N$ measurement statistics 105 (as shown in FIG. 1) include the hypersphere radius $r_i$ 202, the measurement standard deviation $\sigma_i^r$ 206 and the dispersion of measurement dispersion $\sigma_i'^r$ 207 (as shown in FIG. 4).

The measurement hypersphere shell thickness 204 is function of the metric (e.g. Euclidian), the measurement signal-to-noise ratio (SNR) and the number of time samples N. The ratio of the shell thickness 204 over the hypersphere radius 202 tends to 0 when N→∞. This phenomenon is called sphere hardening. Calculated using numerous noise samples, the expected distance $\|X_m-S'_i\|$ appears constant and corresponds to the measurement hypersphere radius 202.

The estimated measurement hypersphere radius $r_i$ 202 is computed from a finite set on M measurement realizations. The estimated signature $S'_i$ 201 corresponds to the $\mathbb{R}^N$ coordinates that minimize the radius length (the estimated hypersphere radius is an underestimation of the real radius length). A fourth part of the "$\mathbb{R}^N$ measurement statistics" 105 is formed of an estimated radius bias error $$\varepsilon_i^s = r_i \cdot \sqrt{\frac{1}{M(M-1)}}, M > 1, \quad (9)$$

that corresponds to an additional radius length observed for a measurement which is not included in the computed estimated signature: $\{X_m : m \notin [1, M]\}$. This radius length bias is attributed to the average signature displacement when a new measurement is added to its estimation.

Referring to FIG. 4, in a preferred trending analysis, a last measurement is compared with a signature moving average and the moving average is compared with a reference signature established at the start of the monitoring. For the first comparison, the measurement is near the hypersphere shell and the statistical deviation is governed by a ratio of a measurement-to-hypersphere shell distance over a measurement standard deviation 206 as expressed in eq. 7. Moreover, a dispersion of measurement dispersion 207 is taken into account. FIG. 4 illustrates the different contributions involved in a deviation probability estimation. The distance difference $D_{m,i}-r_i$ when $\{X_m : m \in [1, M]\}$ or $D_{m,i}-(r_i+\varepsilon_i^{shu})$ when $\{X_m : m \notin [1, M]\}$ is related to the measurement total dispersion 209

$$(\sigma_i^{X-S})^2 = (\sigma_i^r)^2 + (\sigma_i'^r)^2 \quad (10)$$

in order to obtain the probability density $$\Omega(X_m, S_i) = \frac{e^{-(D_{m,i}-r_i-\varepsilon_i^s)^2/2(\sigma_i^{X-S})^2}}{\sigma_i^{X-S}\sqrt{2\pi}} \quad (11)$$

for a large number N of dimensions since for numerous errors contribution, the hypersphere shell density probability function converges to a Laplace-Gauss modeling (central limit theorem).

When the dispersion function is unknown or does not correspond to a possible analytical modeling, a histogram build-up may be carried out with the collected measurements to estimate the density probability function corresponding to the measurement population. A histogram interpolation may replace the modeling for further statistical formulations. Note that for a large number of dimensions, the radius length distribution corresponds to the sum of numerous independent random variables; the central limit theorem states that the resulting distribution converges to a Laplace-Gauss distribution. In respect with the Laplace-Gauss modeling limitation, the hypersphere geometry shows a higher density of measurements on the inside of the shell than on the outside for a same distance to the shell 203 (as shown in FIG. 3). The Laplace-Gauss approximation is good when the shell thickness 204 (as shown in FIG. 3) is much smaller than the shell radius 202, corresponding to a large number N of dimensions. The modeling of Laplace-Gauss dispersion is valid for a large number of dimensions, facilitates implementation of the method and provides an analytical statistical predictability of the behavior (e.g., false positive rate, probability of a pattern matching).

In a warning system that monitors a drift magnitude exceeding k times (k>0) the standard deviation σ, knowing that $$\operatorname{erf}(z) = \frac{2}{\sqrt{\pi}} \int_0^z e^{-\xi^2}\, d\xi, \qquad (12)$$

$$\operatorname{erf}(k/\sqrt{2}) = \frac{\sqrt{2}}{\sigma_n \sqrt{\pi}} \int_0^{k\sigma_n} e^{-x^2/2\sigma_n^2}\, dx \text{ and}$$

$$\operatorname{erfc}(k/\sqrt{2}) = 1 - \operatorname{erf}(k/\sqrt{2})$$

with the integration of probability density expressed in eq. 11, the probability to find a measurement inside the shell exceeding the radius 202 of the cluster shell "i" by $k\sigma_i^{X-S}$ is $$P(X_m, S_i)\,|_{(D_{m,i}-r_i)<k\sigma} = \qquad (13)$$
$$0.5 + \int_0^{+k\sigma_i^{X-S}} \frac{e^{-x^2/2(\sigma_i^{X-S})^2}}{\sigma_i^{X-S}\sqrt{2\pi}} \cdot dx = 0.5 + 0.5 \cdot \operatorname{erf}(k/\sqrt{2}).$$

The probability to find a measurement outside the shell $r_i + k\sigma_i^{X-S}$ is $$P(X_m, S_i)|_{(D_{m,i}-r_i)>k\sigma}=0.5-0.5\cdot\operatorname{erf}(k/\sqrt{2}). \qquad (14)$$

The probability to find a measurement inside the shell $r_i - k\sigma_i^{X-S}$ is $$P(X_m, S_i)|_{(D_{m,i}-r_i)<-k\sigma}=0.5-0.5\cdot\operatorname{erf}(k/\sqrt{2}). \qquad (15)$$

The probability to find a measurement inside and outside the shell boundaries $r_i \pm k\sigma_i^{X-S}$ are respectively $$P(X_m, S_i)|_{|D_{m,i}-r_i|<k\sigma}=1-2\cdot(0.5-0.5\cdot\operatorname{erf}(k/\sqrt{2}))=\operatorname{erf}(k/\sqrt{2}), \text{ and} \qquad (16a)$$

$$P(X_m, S_i)|_{|D_{m,i}-r_i|>k\sigma}=2\cdot(0.5-0.5\cdot\operatorname{erf}(k/\sqrt{2}))=\operatorname{erfc}(k/\sqrt{2}). \qquad (16b)$$

A distance between a measurement 103 and the $S_i$ hypersphere shell 203 is herein referred to as hypersphere radius deviation (HRD) 210 defined as $$HRD_{m,i}=D_{m,i}-r_i \text{ when } \{X_m : m \in [1,M]\} \qquad (17a)$$

and, when a measurement $X_m$ does not contribute to the estimated signature, $$HRD_{m,i}=D_{m,i}-(r_i+\varepsilon_i^s) \text{ when } \{X_m : m \notin [1,M]\} \qquad (17b)$$

For example, in the case of a trending analysis, when the last measurement is compared with a signature average, an alarm may be set by fixing a k maximum value referred to as $k_{max}$. An alarm occurs when $$k \geq k_{max} \qquad (18)$$

with $$k^2 = (HRD_{m,i}/\sigma_i^{X-S})^2. \qquad (19a)$$

or $$k^2 = \frac{(D_{m,i}-r_i)^2}{(\sigma_i^{X-S})^2} = \frac{(D_{m,i}-r_i)^2}{r_i^2 \cdot \left(\frac{1}{N}+\frac{1}{N\cdot(M-1)}\right)} = \qquad (19b)$$

$$\left(\frac{D_{m,i}}{r_i}-1\right)^2 \Big/ \left(\frac{1}{N}\left(1+\frac{1}{M-1}\right)\right),\ M > 1$$

when rewritten in terms of measurement distance to estimated signature $D'_{m,i}$ 205, average measurement distance $r_i$ 202, a number M of measurements and a number N of dimensions. The false alarm rate is defined by eq. 16b with $k=k_{max}$. The method of the invention thus uses the ratio expressed in eq. 19 with a single statistic parameter $k_{max}$ to monitor the whole measurement pattern.

At start-up, the small M value increases the dispersion (eq. 7 and eq. 8). A HRD value observed at start-up appears less significant than the same deviation observed after collection of more measurements. The k factor sensitivity increases proportionally to $\sqrt{M-1}$, thus reducing the occurrence of false positive at start-up.

When the combined deviation of a plurality of L measurements 103 is considered from the signature i, the corresponding k value can be estimated from the average HRD value. Less accurate, $$k^2 = \frac{1}{L}\sum_{l=1}^{L}\left(\frac{HRD_{l,i}}{\sigma_i^{X-S}}\right)^2 = \frac{1}{L}\sum_{l=1}^{L} k_l^2 \qquad (20)$$

is another estimation expression for combining many measurements (see Appendix 1). The same expression can be used for combining a plurality of L measurement deviations from the same number of corresponding signatures projected in different $\mathbb{R}^N$ subspaces when $$k_l \frac{HRD_{l,i}}{\sigma_i^{X-S}}. \qquad (21)$$

Note that in the latter case, since k is dimensionless, the engineering unit corresponding to the hypersphere subspace l can be fixed arbitrarily. For example, using eq. 20 and eq. 21, it is possible to mix the deviation of a vibration reading with the deviation observed on multiple temperature readings.

Figure 5:
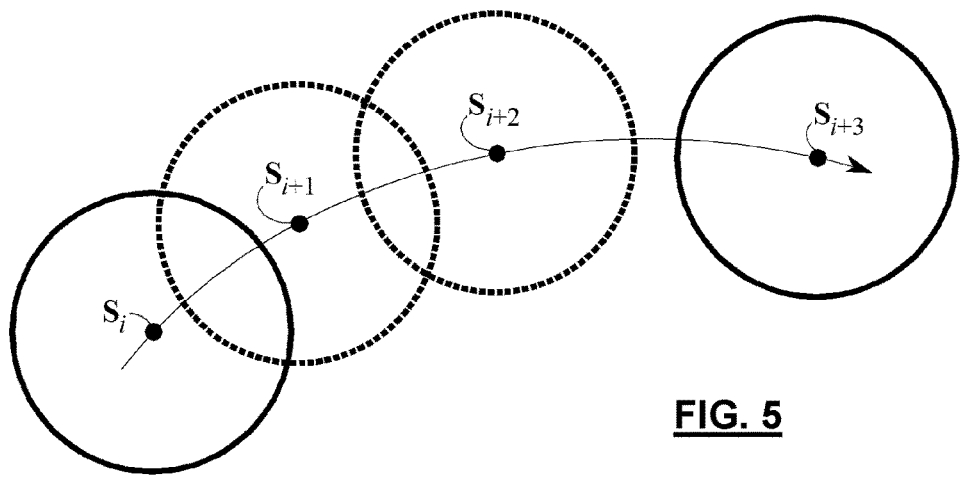
FIG. 5 is a schematic diagram providing a N-dimensional illustration of a trend of a signature at four different stages.
Figure 6:
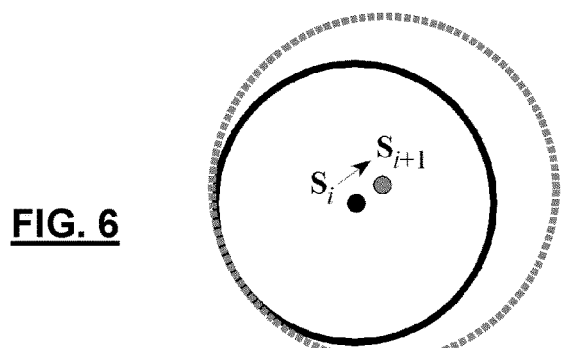
FIG. 6 is a schematic diagram providing a N-dimensional illustration of a trending of a signature at two different stages where a measurement dispersion appears larger for a last signature $S_{i+1}$.

Referring to FIG. 5, a trend in a signature may be considered as successive signatures starting from an initial signature. Different possibilities exist for the evolution step between two successive signatures. A first possibility is easier to detect and corresponds to the case of $(S_i, S_{i+2})$, $(S_i, S_{i+3})$ and $(S_{i+1}, S_{i+3})$ comparisons. The comparisons $(S_i, S_{i+1})$ and $(S_{i+1}, S_{1-2})$ are more difficult since two hyperspheres are overlapping; some measurements may be shared by both clusters. The problem is a signature to signature discrimination and distance estimation. FIG. 6 shows the worst case where the signature step is less than the noise radius and where the noise fluctuation is also in the same amplitude range as the step. In the illustrated case, the measurement dispersion appears larger for the last signature $S_{i+1}$. These illustrations may be also applied for pattern recognition where a running signature is compared to a signature extracted from a database. It will be seen that the $\mathbb{R}^N$ representation of the signal allows discrimination of two signatures even if the measurement hyperspheres are overlapped.

Figure 7:
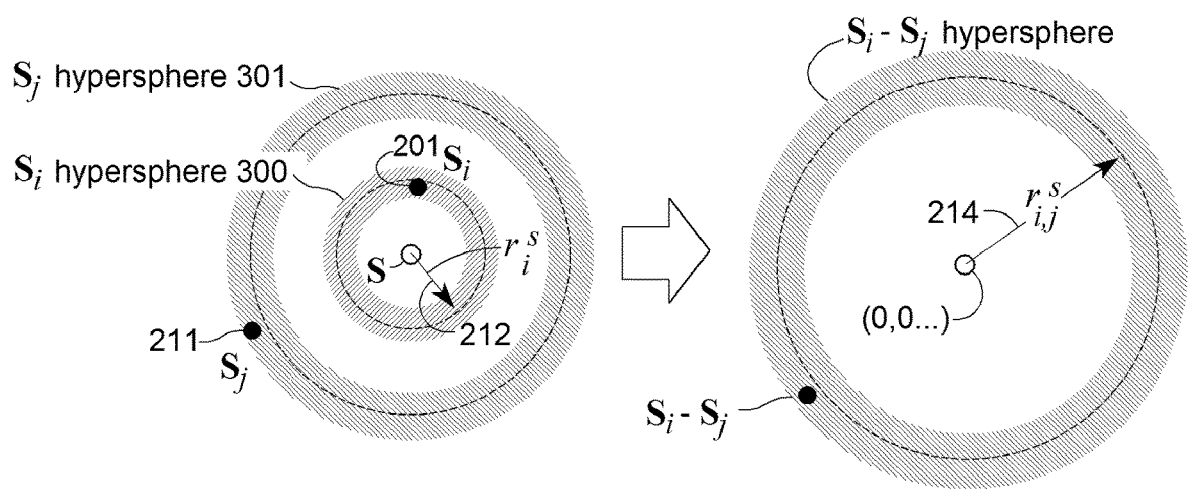
FIG. 7 is a schematic diagram illustrating hyperspheres of two signatures related to a same denoised signature and a hypersphere corresponding to signature subtraction.
Figure 8:
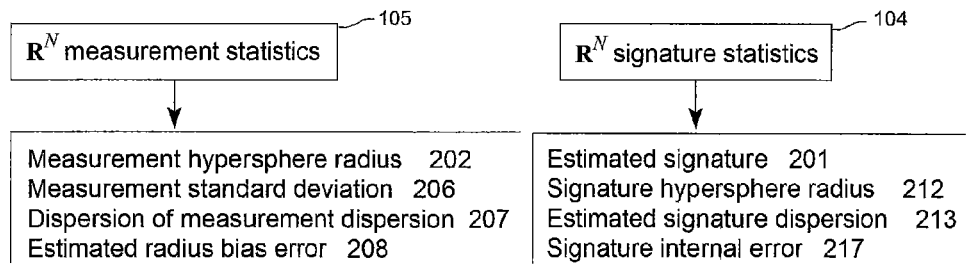
FIG. 8 is a schematic diagram illustrating details for $\mathbb{R}^N$ measurement and signature statistics according to the invention.
Figure 9:
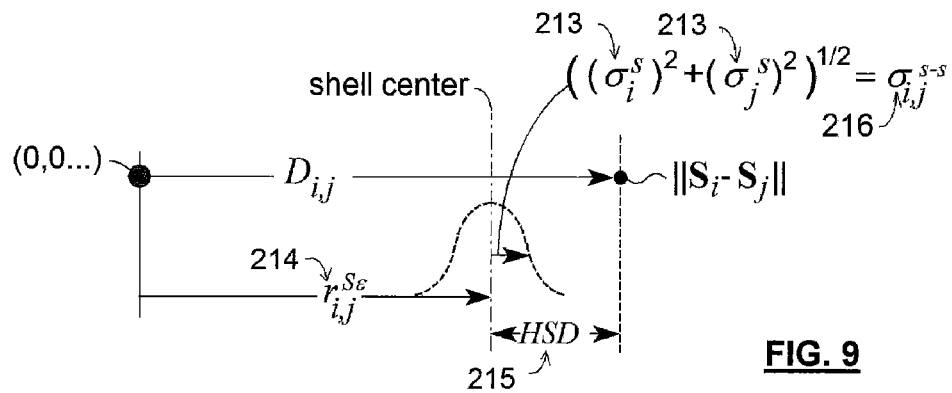
FIG. 9 is a schematic diagram illustrating an estimated signature $S'_i$ to estimated signature $S'_j$ distance $D_{i,j}$ with total signature dispersion $\sigma_{i,j}^{S-S}$ and hypersphere to signature distance (HSD).

Referring to FIG. 7, the coordinates of the estimated signature $S'_i$ 201 in $\mathbb{R}^N$ appears function of the available corresponding measurements 103 (as shown in FIG. 3). Different measurement sets yield different estimated signature coordinates. There exist an estimation bias $E|S_i-S'_i|$ and an expectation for the bias dispersion. As illustrated on the left, two signature estimations $S'_i$ 201 and $S'_j$ 211 are located on their respective signature hyperspheres 300, 301, both centered on their common denoised signature S. As second part of the "$\mathbb{R}^N$ signature statistics" 104 (as shown in FIG. 1), the estimated signature $S'_i$ hypersphere radius 212

$$r_i^s = r_i \cdot \sqrt{\frac{1}{M_i}} \tag{22}$$

decreases when the number of measurements increases. As third part of the "$\mathbb{R}^N$ signature statistics" 104, the signature dispersion 213 (as shown in FIG. 9)

$$\sigma_i^s = \sqrt{\frac{1}{M(M-1)}\sum_{m=1}^{M}\left(r_i - \sqrt{\sum_{n=1}^{N}(x_{m,n}-S'_{i,n})^2}\right)^2} = \tag{23a}$$

$$\sigma_i^r \sqrt{\frac{1}{M-1}}, M > 1$$

calculated from measurements or estimated $$\sigma_i^s = r_i \cdot \sqrt{\frac{1}{2N(M-1)}}, M > 1, \text{(Gaussian white noise assumption)} \tag{23b}$$

decreases when the number of dimensions increases. The estimated radius bias error $\varepsilon_i^s$ 208 (as shown in FIG. 8) given by eq. 9 is a fourth part of the "$\mathbb{R}^N$ signature statistics" 104 and corresponds to an internal error of the signature estimation location in $\mathbb{R}^N$.

Note that $\sigma_i^s$ has the same mathematical expression as the "dispersion of measurement-to-shell dispersion" $\sigma_i^n$ (eq. 8). In some special cases, these two estimations do not correspond to the same dispersion phenomenon: e.g. considering a merging of two signatures estimated with different noise amplitudes, the dispersion $\sigma_i^s$ decreases when $\sigma_i^n$ may increases with the merging. FIG. 8 sums-up the statistic estimations associated with measurements and signature.

The distance between two hyperspheres $$D_{i,j} = \|S'_i - S'_j\| = \sqrt{\sum_{n=1}^{N}(S'_{i,n}-S'_{j,n})^2} \tag{24}$$

can be illustrated as one hypersphere centered on a zero-origin coordinate (FIG. 7 right). The signature-to-signature distance hypersphere radius length 214

$$r_{i,j}^s = \sqrt{(r_i^s)^2+(r_j^s)^2} \tag{25a}$$

is the quadratic sum of the respective hypersphere radius lengths. Including the internal error in the radius length, the signature distance hypersphere radius length 214 can be rewritten $$r_{i,j}^{s\varepsilon} = \sqrt{(r_{i,j}^s)^2+(\varepsilon_i^s)^2+(\varepsilon_j^s)^2}. \tag{25b}$$

A distance between two signatures is herein referred to as hypersphere signature deviation (HSD) 215 defined as $$HSD_{i,j} = D_{i,j} - \sqrt{(r_{i,j}^s)^2+(\varepsilon_i^s)^2+(\varepsilon_j^s)^2} = D_{i,j} - r_{i,j}^{s\varepsilon} \tag{26}$$

(see Appendix 2).

FIG. 9 illustrates a signature-to-signature comparison. The estimated signature $S'_i$ hypersphere radius 212 given at eq. 22 is used in the case of uniform average. For a moving average signature with non-uniform weighting, the radius 212 exists with a different mathematical expression. Whatever the mathematical expression of averaging and the corresponding dispersion, the total dispersion $$(\sigma_{i,j}^{S-S})^2 = (\sigma_i^s)^2+(\sigma_j^s)^2 \tag{27}$$

between signatures 216 is related to HSD 215 in order to obtain the probability density $$\Omega(S_i,S_j) = \frac{e^{-HSD_{i,j}^2/2(\sigma_{i,j}^{S-S})^2}}{\sigma_{i,j}^{S-S}\sqrt{2\pi}} \tag{28}$$

in the case of a Laplace-Gauss dispersion modeling. Note that when $\sigma_{i,j}^{S-S} \ll r_{i,j}^s$, the $\mathbb{R}^N$ representation of the signal may allow discrimination of two signatures even if the signature hyperspheres overlap. From eq. 12 and with integration of probability density expressed in eq. 28, the probability to find the moving average signature inside the $k \cdot \sigma_{i,j}^{S-S}$ limit is $$P(S_i,S_j)|_{D_{i,j}<k\sigma} = \int_0^{+k\sigma_{i,j}^{S-S}} \frac{e^{-HSD_{i,j}^2/2(\sigma_{i,j}^{S-S})^2}}{\sigma_{i,j}^{S-S}\sqrt{2\pi}} \cdot dx = \text{erf}(k/\sqrt{2}). \tag{29}$$

For example, in a signature-to-signature comparison, an alarm may be set by fixing a k maximum value $k_{max}$. An alarm occurs when $k \geq k_{max}$ with $$k = HSD_{i,j}/\sigma_{i,j}^{S-S}. \tag{30}$$

The false alarm rate is defined by eq. 16b with $k=k_{max}$. The method of the invention thus uses the ratio expressed in eq. 30 with a single statistic parameter $k_{max}$ to monitor the whole signature pattern matching. Similarly to the merging process proposed at eq. 20 and eq. 21, the expression $$k^2 = \frac{1}{L}\sum_{l=1}^{L}\left(\frac{HSD_l}{\sigma_l^{S-S}}\right)^2 = \frac{1}{L}\sum_{l=1}^{L}k_l^2 \tag{31}$$

may be used to merge the probability of L signature-to-signature comparisons.

The method of the invention is optimal when noise amplitude is uniformly distributed among the measurements such as set forth in eq. 1. When noise amplitude is non-uniformly distributed, a normalization $$X'_{mn} = X_{mn} \cdot \frac{1}{\sigma_n}, n \in [1, N] \tag{32}$$

of measurements with $$\sigma_n^2 = \frac{1}{M-1} \cdot \sum_{m=1}^{M} (X_{m,n} - \overline{X}_n)^2, M > 1 \tag{33}$$

and $$\overline{X}_n = \frac{1}{M} \cdot \sum_{m=1}^{M} X_{m,n} \tag{34}$$

yields a uniform standard deviation through the different measurements. A drawback of such a normalization may occur when a measuring problem (e.g. amplitude clipping) or another unexpected event decreases the dispersion of some measurement samples; with the proposed normalization, more weight is assigned to such biased measurement samples. The normalization $$X'_{mn} = X_{mn} \cdot \sqrt{\frac{2}{\overline{\sigma}^2 + \sigma_n^2}}, n \in [1, N] \tag{35a}$$

with $$\overline{\sigma} = \frac{1}{N} \cdot \sum_{n=1}^{N} \sigma_n \tag{35b}$$

is an example of normalization which may partially overcome the drawback.

In some cases, the noise appears function of the measured signal amplitude. WO 2012/162825 (Léonard) proposes the use of a dedicated metric to distort the subspace in order to obtain a cluster close to a hypersphere.

Figure 10:
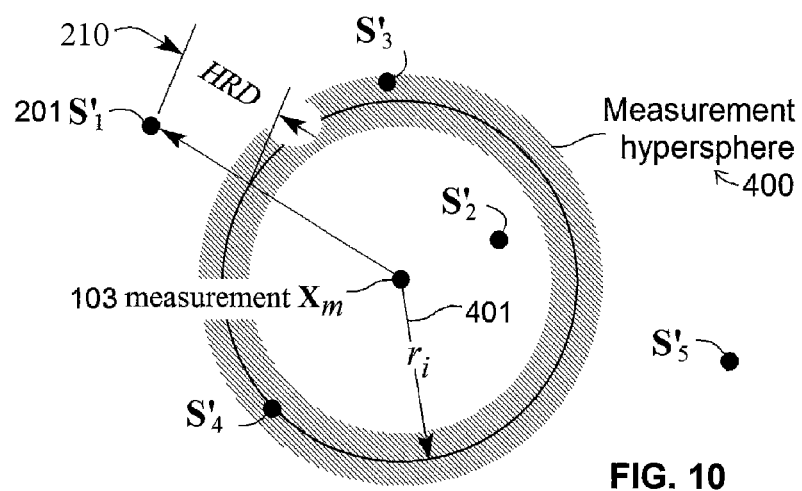
FIG. 10 is a schematic diagram providing a N-dimensional illustration of a distribution of measurement membership likelihoods for a set of signatures.

Referring to FIG. 10, when a measurement may be a member of one signature among many possible signatures, the $\mathbb{R}^N$ visualisation is reversed between measurement and signature to resolve the classification problem. As illustrated, the measurement hypersphere 400 is centered with the measurement. The measurement hypersphere radius 401

$$r = \sqrt{NE(n_{mn}^2)} \tag{36}$$

corresponds to the average noise vector length projected in $\mathbb{R}^N$. When only one or a few measurements are available to feed eq. 6, it will be more accurate to replace eq. 36 by a local average of signature hypersphere radius in the vicinity of the measurement, assuming that the noise amplitude is similar for the surrounding signatures. In the illustrated case of similar signature dispersion $\sigma_i^s$ for $S'_1$ to $S'_5$, the measurement maximum membership likelihood is obtained for the signature $S'_4$.

In this context, the hypersphere radius deviation (HRD 210) is the distance between the signature and the measurement hypersphere 400. The density probability function $$\Omega(X_m, S_i) = \frac{e^{-(D_{m,i} - r_i)^2/2(\sigma_i^{X-S})^2}}{\sigma_i^{X-S}\sqrt{2\pi}} \tag{37}$$

appears similar to that expressed at eq. 11 in the case of a Laplace-Gauss dispersion modeling. The membership likelihood of the measurement "m" for the signature "i"

$$P(X_m \in S_i) = \frac{\Omega(X_m, S_i)}{\sum_j \Omega(X_m, S_j)} \tag{38}$$

is related to the sum of all density probability functions existing in the vicinity of the measurement. Note that $P(X_m \in S_i)=1$ when only one signature is considered (e.g. in trending).

Referring to FIG. 11, looking at the $\mathbb{R}^N$ projection of many measurement sets, the estimated signature $S'_{i,x}$ 201 associated with one of these sets, with the corresponding measurement hypersphere radius 202, appears in the shell of an hypersphere 300 having its center close to the real signature $S_i$ 100. When the other signature estimations are built with the same measurement population and similar noise amplitude, the signature locations are close to a common signature hypersphere shell 300. In other words, similar signature estimations appear located in the shell of a smaller hypersphere centered on the real signature $S_i$.

The signatures may be processed like individual measurements 103 with an estimated signature, a hypersphere radius and hardness. The measurement set may be split into many signatures by a simple uniform averaging over $m_a$ measurements such as $$X_{m_a,l} = \frac{1}{m_a} \sum_{m=1}^{m_a} X_{m+l \cdot m_a}. \tag{39}$$

The initial measurement sets of M realizations became a signature set showing a population of $M/m_a$. The estimated signature from $M/m_a$ signatures is the same as the signature obtained from M measurements, but the $\mathbb{R}^N$ measurement statistics 105 (as shown in FIG. 1) differ. The trending and pattern matching described earlier for a set of measurements is also valid for the set of signatures. The action of generating a signature from other signatures or from initial measurements is herein referred to as averaging step. An evolution step may for example correspond to an averaging step of successive measurements or successive evolution steps. In other words, the proposed method may include some recursive aspects.

The respective hypersphere radius, measurement dispersion and estimation error on measurement dispersion for an initial measurement set of M realizations can be expressed as function of noise energy expectation $\eta_0^2 = E(n_{mn}^2)$ as $$r_i = \eta_0 \sqrt{N}, \sigma_i^r = \eta_0 \sqrt{1/2} \text{ and } \sigma_i'^r = \eta_0 \cdot \sqrt{\frac{1}{2 \cdot (M-1)}} \tag{40}$$

from eq. 6, eq. 7 and eq. 8. Splitting the measurement set in $M/m_a$ averaged measurements reduces the noise energy expectation of the resulting signatures by a $m_a$ factor. The averaged measurement hypersphere radius and shell dispersion $$r_{m_a,i} = \eta_0 \cdot \sqrt{N \cdot \frac{1}{m_a}} \text{ and } \sigma^r_{m_a,i} = \eta_0 \cdot \sqrt{\frac{1}{2m_a}} \quad (41)$$

appear stretched compared to the original set of M measurements when the estimation error on measurement dispersion $$\sigma^{\prime r}_{m_a,i} = \eta_0 \cdot \sqrt{\frac{1}{2m_a \cdot \left(\frac{M}{m_a} - 1\right)}} \text{ or } \approx \eta_0 \cdot \sqrt{\frac{1}{2(M-1)}} \text{ for } M \gg m_a \quad (42)$$

appears approximately unchanged. An interesting fact is that the ratio $r/\sigma^r$ appears unchanged through the splitting transform when the ratio $r/\sigma^{\prime r}$ decreases: the $\mathbb{R}_M^N \to \mathbb{R}_{M/m_a}^N$ averaging step stretches unequally the hypersphere geometric characteristics. By inserting eq. 40 into eq. 10, the total dispersion expressed in terms of noise expectation energy is $$\left(\sigma^{X-S}_{m_a,i}\right)^2 = \left(\sigma^r_i\right)^2 + \left(\sigma^{\prime r}_i\right)^2 = 0.5 \cdot \eta_0^2 + \frac{\eta_0^2}{2 \cdot (M-1)} = \frac{1}{2}\left(\frac{M}{M-1}\right) \cdot \eta_0^2. \quad (43)$$

The corresponding total dispersion after the $\mathbb{R}_M^N \to \mathbb{R}_{M/m_a}^N$ averaging step is $$\left(\sigma^{X-S}_{m_a,i}\right)^2 = \frac{1}{2m_a}\eta_0^2 + \frac{1}{2m_a \cdot \left(\frac{M}{m_a} - 1\right)} \cdot \eta_0^2 \quad (44)$$

or $$\left(\sigma^{X-S}_{m_a,i}\right)^2 \bigg|_{M \gg m_a} \approx \frac{1}{2}\left(\frac{1}{m_a} + \frac{1}{M}\right) \cdot \eta_0^2. \quad (45)$$

The $\mathbb{R}_M^N \to \mathbb{R}_{M/m_a}^N$ averaging step significantly reduces the total dispersion with the drawback of an increased response time of $m_a$ sample delay.

The average of $m_a$ measurements may be compared to a signature using $$D_{l,i} = \|X_{m_a,l} - S'_i\| = \sqrt{\sum_{n=1}^{N}(X_{m_a,l,n} - S'_{i,n})^2} \quad (46)$$

from eq. 5. In that case, the $\mathbb{R}^N$ measurement statistics 105 (as shown in FIG. 1) of the average measurements may be estimated from eq. 7 and eq. 8 using $X_{m_a,l}$ instead $X_m$, or rewritten as function of the statistics obtained without measurement averaging such as $$r_{m_a,i} = r_i \cdot \sqrt{\frac{1}{m_a}}, \quad (47)$$

$$\sigma^r_{m_a,i} = \sigma^r_i \cdot \sqrt{\frac{1}{m_a}} \quad (48)$$

and $$\sigma^{\prime r}_{m_a,i} = \sigma^{\prime r}_i \cdot \sqrt{\frac{(M-1)}{(M-m_a)}}. \quad (49)$$

The signature location error $$\varepsilon^s_{m_a,i} = \varepsilon^s_i \quad (50)$$

is unchanged since the error is only function of the M measurement set used for signature estimation.

The HRD of averaged measurements is $$HRD_{l,i} = D_{l,i} - r_{m_a,i} \text{ when } \{X_{m+l \cdot m_a} : m+l \cdot m_a \in [1,M]\} \text{ in eq. 39} \quad (51)$$

and, when the measurement $X_m$ does not contribute to the estimated signature $$HRD_{l,i} = D_{l,i} - (r_{m_a,i} + \varepsilon^s_i) \text{ when } \{X_{m+l \cdot m_a} : m+l \cdot m_a \notin [1,M]\} \text{ in eq. 39} \quad (52)$$

Figure 12:
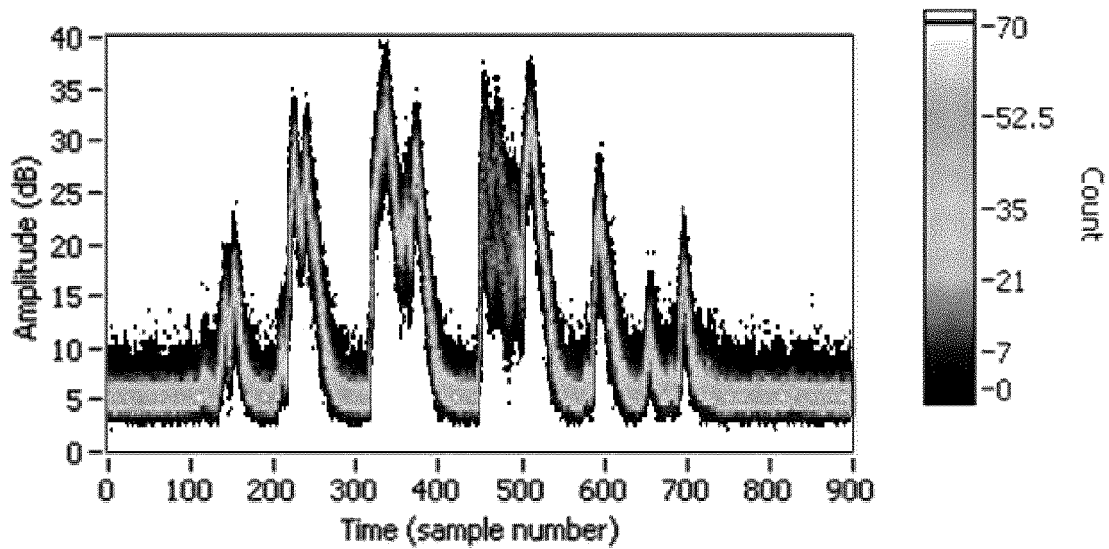
FIG. 12 is a graph illustrating concatenated time series of histograms generated using vibroacoustic measurements.
Figure 13:
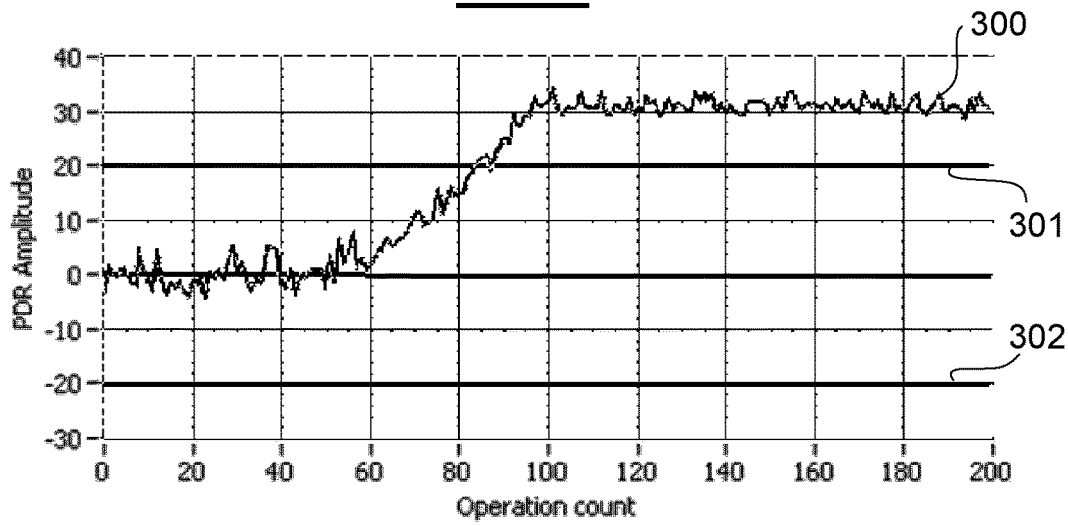
FIG. 13 is a graph illustrating a curve resulting from application of the method according to the invention on the vibroacoustic measurements of FIG. 12 and alarm settings.

Referring to FIG. 12, there is shown a graph illustrating concatenated time series of histograms generated using 250 vibroacoustic measurements taken from an electrical equipment in operation. The horizontal axis represents time expressed in the form of sample numbers of the measurements, the vertical axis represents the amplitude of the measurements in dB, and the measurements have tones according to the shading legend as function of sample count. Processing of the measurements according to the method of the invention produces a $\mathbb{R}^N$ hypersphere similar to that shown in FIG. 3 and a signature drift similar to that shown in FIG. 5 due to a drift between the samples 450-500. FIG. 13 shows a curve 300 representing the radius deviation computed on the vibroacoustic measurements of FIG. 12 according to the method of the invention, and alarm settings 301, 302 fixed respectively to +4σ and −4σ. In the illustrated example, the hypersphere radius reaches a value of 34.2171 with a hypersphere hardness of 1.14184 and a signature dispersion of 4.88816. To sum up, the projection of the N-samples signal in a multidimensional space $\mathbb{R}^N$ for several realizations of measurement shows a distribution close to a hypersphere of radius r, where r corresponds to the statistical average of measurement dispersion. At the center of the hypersphere is located the estimated signature $S'_i$. The statistical "thickness" of the hypersphere shell is the "hardness" of the hypersphere. As a result of the "sphere hardening phenomenon", the hardness to radius ratio decreases with the increasing number N of dimensions. The measurement probability density appears as function of the distance between the measurement and the hypersphere surface, with the distance related to the hardness. In the case of a large number of dimensions, the measurement distance to the hypersphere shell density probability function converges to a Laplace-Gauss modeling (central limit theorem) and yields an analytical statistical formulation for the measurement likelihood. The proposed method gradually increases the sensitivity with the new measurements. Occurrence probability of "false positive" (false alarm) appears constant from start-up through steady state: the false alarm rate at start-up is similar to that occurring in steady state.

Figure 14:
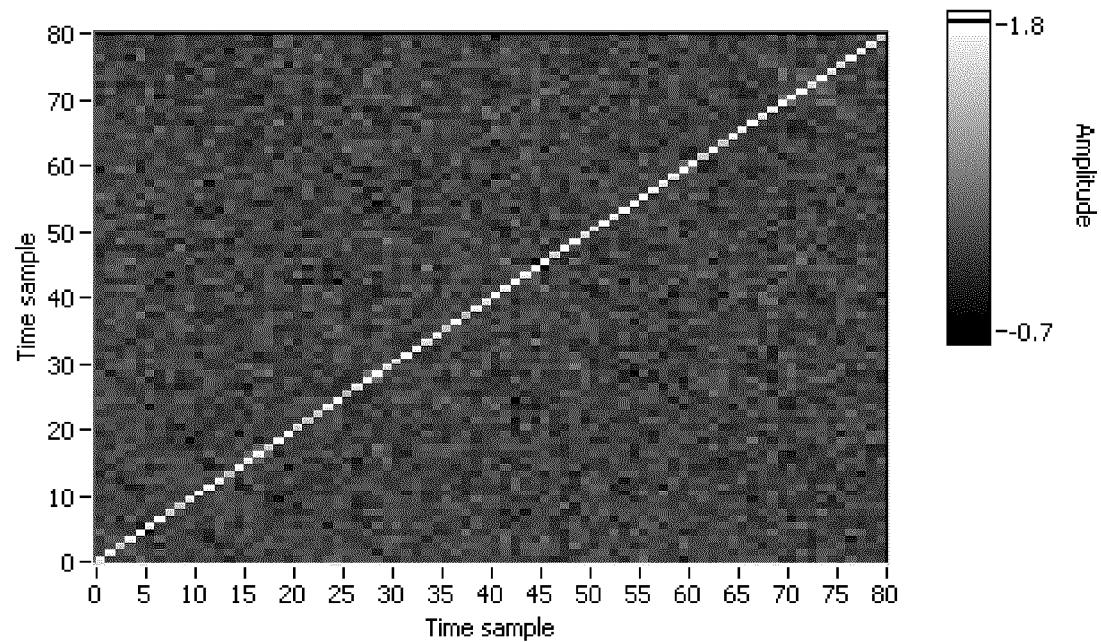
FIG. 14 is a graph illustrating an estimated covariance matrix generated using the vibroacoustic measurements of FIG. 12.

Referring to FIG. 14, let's consider the N samples measurement $X_m = (X_{1,m}, \ldots, X_{i,m}, \ldots, X_{N,m})^T$ expressed in eq. 1 as a m-th realization of a vector of random variables $X_n$, each with a finite variance. A set of M realisations is used in the estimation of the covariance matrix $$\Sigma_{i,j} = \text{cov}(X_{i,m}, X_{j,m}) = E[(X_{i,m} - \mu_i) \cdot (X_{j,m} - \mu_j)] \quad (53)$$

where $$\mu_i = E[X_{i,m}] \quad (54)$$

is the expected value of the i-th entry in the vector X. Expressed as $$\sum = \begin{pmatrix} E[(X_{1,n} - \mu_1) \cdot (X_{1,n} - \mu_1)] & K & E[(X_{1,n} - \mu_1) \cdot (X_{N,n} - \mu_N)] \\ M & O & M \\ E[(X_{N,n} - \mu_N) \cdot (X_{1,n} - \mu_1)] & L & E[(X_{N,n} - \mu_N) \cdot (X_{N,n} - \mu_N)] \end{pmatrix}, \tag{55}$$

the matrix appears square and symmetric. The same logic used for the $\mathbb{R}^N$ projection of a signature is now applied for the projection of the covariance matrix in $\mathbb{R}^{NN}$. The N-dimensionality of a signature is replaced by the N×N-dimensionality of a variance.

Projected in the subspace $\mathbb{R}^{NN}$, the M cross-measurement matrices $$\sum_{i,j,m} = [(X_{i,m} - \overline{X}_i) \cdot (X_{j,m} - \overline{X}_j)]$$

with $$\overline{X}_i = \frac{1}{M} \sum_{m=1}^{M} X_{i,m}$$

generate a cluster of points, each one corresponding to a measurement. The estimated covariance matrix $$\sum'_{i,j} = \frac{1}{M} \sum_{m=1}^{M} \sum_{i,j,m} = \frac{1}{M} \sum_{m=1}^{M} [(X_{i,m} - \overline{X}_i) \cdot (X_{j,m} - \overline{X}_j)] \tag{56}$$

corresponds to a point located at the mass center of the cross-measurement matrix cluster.

As for the signature trending, the updated estimated covariance matrix and the following other estimations may be generated by a moving average process (uniform average is presented here to keep the mathematical expressions short). In the case of an Euclidian metric in $\mathbb{R}^{NN}$ with uniform averaging, the cross-measurement matrices to estimated covariance matrix distance $$D_{m,i} = \tag{57}$$

$$\left\| \sum_{i,j,m} - \sum'_{i,j} \right\| = \left( \sum_{i=1}^{N} \sum_{j=1}^{N} \left( (X_{i,m} - \overline{X}_i)(X_{j,m} - \overline{X}_j) - \sum'_{i,j} \right)^2 \right)^{\frac{1}{2}}$$

has the expected mean distance $$r_i = \frac{1}{M} \sum_{m=1}^{M} D_{m,i} \text{ for } X_m \in \text{cluster "} i", \tag{58a}$$

or (possibly less accurate)

$$r_i = \sqrt{\frac{1}{M} \sum_{m=1}^{M} D_{m,i}^2} \text{ for } X_m \in \text{cluster "} i", \tag{58b}$$

for a given measurement set. This estimation is referred to as covariance hypersphere radius and the double of the expected standard deviation $$\sigma_i^r = \sqrt{\frac{1}{M} \sum_{m=1}^{M} (D_{m,i} - r_i)^2} \tag{59a}$$

is referred to as thickness of the cross-measurement matrix distance to radius distribution calculated from the cross-measurement matrices or estimated $$\sigma_i^r = r_i \cdot \sqrt{\frac{1}{2N}} \text{ (Gaussian white noise assumption)} \tag{59b}$$

from the estimated covariance hypersphere radius length. In the case of Gaussian white noise, the estimated dispersion (eq. 59b) appears with less dispersion than the calculated one (eq. 59a). For a small M set, the estimation error on the standard deviation, the dispersion of measurement dispersion $$(\sigma_i'^r)^2 = \frac{\sigma_i'^2}{M-1} \text{ or} \tag{60}$$

$$\sigma_i' = r_i \cdot \sqrt{\frac{1}{2N \cdot (M-1)}} \text{ (Gaussian white noise assumption)}$$

should be also taken in account. Finally, the estimated radius bias error $$\varepsilon_i^s = r_i \cdot \sqrt{\frac{1}{M(M-1)}}, M > 1, \tag{61}$$

corresponds to an additional radius length observed for a measurement which is not included in the computed estimated covariance: $\{X_m : m \notin [1, M]\}$.

The further development of covariance trending and pattern recognition is similar to that developed for signatures.

FIG. 14 illustrates the measurements shown in FIG. 12 transposed in the estimated covariance.

Figure 17:
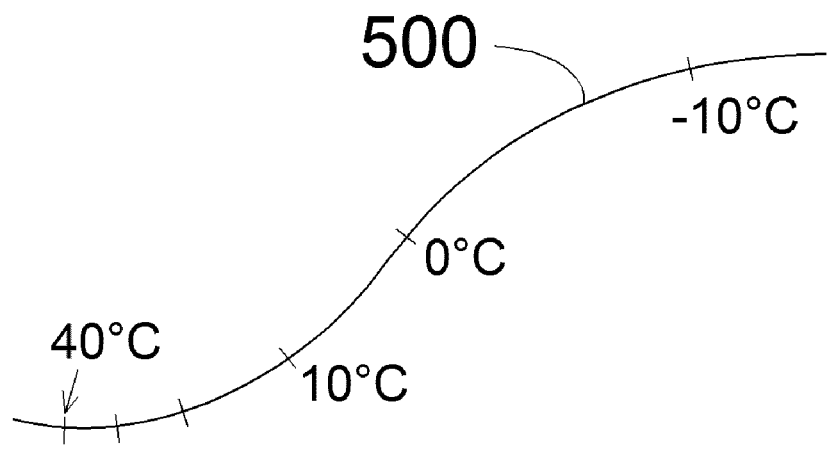
FIG. 17 is a schematic diagram providing a N-dimensional illustration of a signature domain for a signature sensitive to the temperature operating condition.
Figure 18:
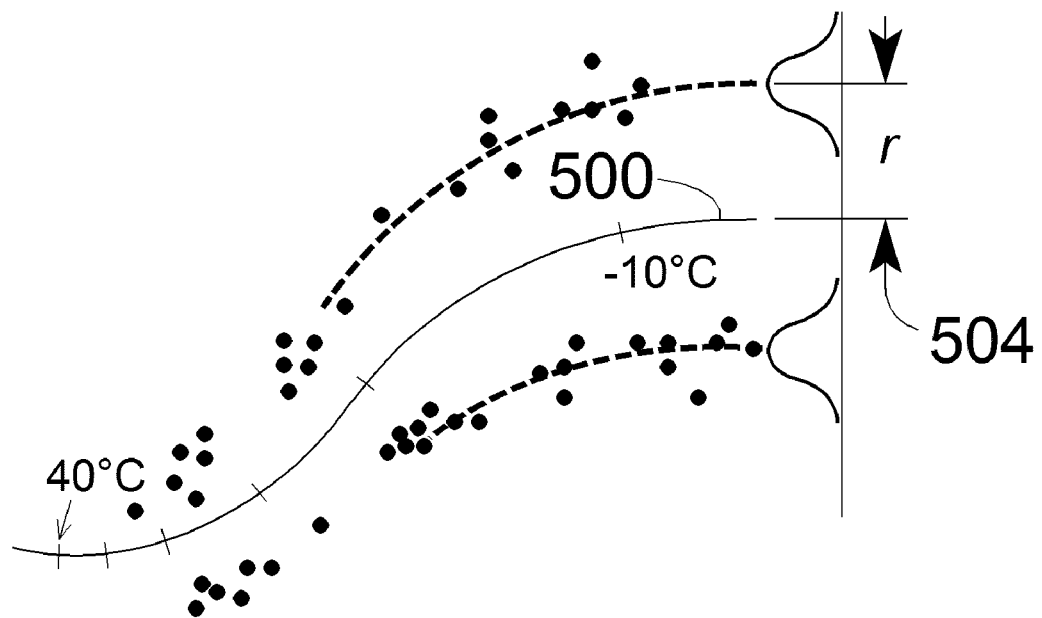
FIG. 18 is a schematic diagram providing a N-dimensional cut view illustration of the measurements dispersion around the signature domain where the dispersion amplitude increases when temperature decreases.

In multidimensional space $\mathbb{R}^N$, a signature for a given operating conditions appears as a point. If the signature changes with one of the operating conditions, e.g. with the temperature, the signature domain 500 for a temperature range corresponds to a path in $\mathbb{R}^N$ as shown in FIG. 17. In the illustrated example, the path is moving faster at lower temperatures. The measurement standard deviation can also change with the operating conditions. FIG. 18 shows the dispersion of measurements around the signature domain 500. For a point on the path shown in FIG. 17 corresponding to a given temperature, each corresponding realization appears in the shell of a hypersphere centered to this point. If a superposition of hypersphere shells centered on the signature domain 500 is considered, the resulting density function is a cylindrical shell centered with respect to the signature domain 500. In the case of measurement standard deviation function of the temperature, the cylindrical radius appears variable and as function of the standard deviation as illustrated in FIG. 18.

If the signature changes with two of the operating conditions, e.g. with the temperature and the load, the signature domain then corresponds to a 2-D surface in $\mathbb{R}^N$. The density probability function of a realisation in $\mathbb{R}^N$ appears like a shell enveloping the signature surface domain. The standard deviation of the realizations sets the distance between the shell and the signature domain.

In the current context, the measurement domain has N dimensions, the signature domain has L dimensions, and the number of descriptive variables are the minimum number of variables needed to describe a domain. For example, a hypersphere in $\mathbb{R}^N$ has N−1 dimensions. Also called a n-sphere with n=N−1 in that case, the location of a point onto its surface can be achieved with N−1 coordinates but the mathematical description of the n-sphere needs n+2 descriptive variables (i.e. N coordinates plus the radius). The case where a signature changes with one of the operating conditions corresponds to one dimension but the cylindrical shell, representative of the center of the density probability function of a realisation, enveloping the signature domain has N−1 dimensions.

Figure 19:
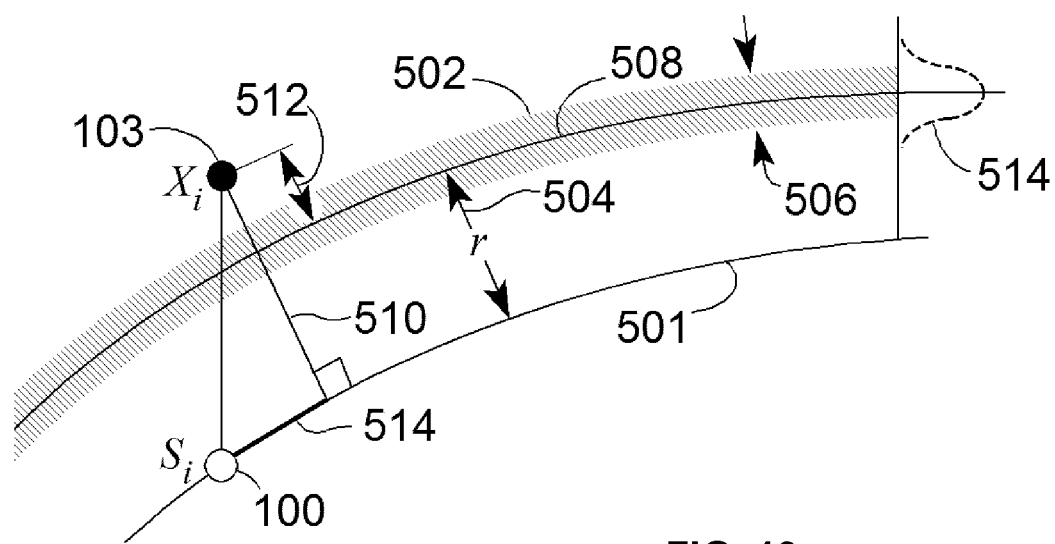
FIG. 19 is a schematic diagram providing a N-dimensional cut view illustration of the shell manifold corresponding to measurements probability function density located in the neighbourhood of the signature domain manifold.

Referring to FIG. 19, at this point we will generalize the $\mathbb{R}^N$ statistics to $\mathbb{R}^{N,L}$. The one point domain signature associated to a hypersphere corresponds to a $\mathbb{R}^{N,0}$, with L=0 dimension for a point. The 1D path of a signature sensitive to one of the operating conditions corresponds to the $\mathbb{R}^{N,1}$ case. The 2D signature sensitive to two of the operating conditions corresponds to the $\mathbb{R}^{N,2}$ case and so on. If the signature changes with L of the operating conditions, the signature domain for an operating condition range corresponds to an N,L-manifold 501 in $\mathbb{R}^N$. The density probability function of a realisation in $\mathbb{R}^N$ appears like a manifold enveloping the N,L-manifold signature domain 501.

A manifold is a topological space showing the same properties of the Euclidean space near each point element of the manifold. Locally, close to the manifold, the Euclidean distance can be used. However, on a greater scale, the manifold shape adds a bias to a Euclidian distance estimator and globally, a manifold might not resembles a Euclidean space. The 1D path of a signature is an open manifold and also the 2D signature in $\mathbb{R}^N$. A hypersphere is a closed manifold and, for the general case $\mathbb{R}^{N,L}$, the enveloping manifold associated to the density probability function of a realisation is also a closed manifold.

A new geometric figure called "shell manifold" is herein introduced. A shell manifold is a manifold enveloping a second manifold and has at least one additional dimension called thickness. Locally, the thickness 506 is oriented perpendicular to the signature manifold 501. In the context of the proposed method, the shell manifold defines the density probability function of a realisation in $\mathbb{R}^N$. In this context, the shell thickness 506 is defined as the double of the standard deviation of the measurement distance 510 with respect to the signature manifold 501. The shell "center" is representative of the mass center of the density probability function of a realisation. The Laplace-Gauss density probability function has its maximum of density in coincidence with the shell center. A shell center and a thickness are enough to represent a Laplace-Gauss density probability function but it is not the case for Poisson law and many other distribution laws having their mass center not aligned with their maximum and requiring some additional parameters to describe their distribution. In practice, with numerous dimensions N, the central limit theorem can be applied locally and a section of the shell manifold can be described by the Laplace-Gauss function. Moreover, in the case of non-constant distance between the enveloping manifold and the signature (i.e. the measurement standard deviation appears function of the coordinates which define a point into a signature domain), comparatively to a N,L-manifold associated to a signature, many additional descriptive variables are required to define the enveloping shell manifold shape or density. In the simplest case of constant amplitude Laplace-Gauss noise addition over the N dimensions, the distance shell to signature manifold and the shell thickness are constant. It should be noted that taken locally in the vicinity of the shell, the density probability function of a realisation fills the $\mathbb{R}^N$ volume if the function is not bound (e.g. Laplace-Gauss function): the shell manifold corresponding to the density probability function of a realisation has N+1 dimensions (N coordinates plus the density).

The signature manifold may be built from the averaging of the available realizations. While a simple realization addition (eq. 4) works for the case L=0, the averaging method appears more complex for L>0 since a fit must be made to model the manifold pattern. In that case, the krigging method (see e.g. dual krigging method developed by Matheron) may be the best unbiased linear interpolator and takes account of the local dispersion of the measurements. Before krigging, the merging of close realizations may allow a first estimation of the local dispersion and reduce the computing task.

Locally, the topological space of the shell manifold shows the same properties of the Euclidean space on the manifold. Perpendicularly to the shell manifold, the same Euclidian space properties also exist for a small distance to the manifold, when the measurement distance to shell center 512 is smaller than local manifold curvature. For those conditions, the statistic rules to be used for the general case of $\mathbb{R}^{N,L}$ appear similar to the equation set defined for a hypersphere with $\mathbb{R}^{N,0}$. However, the radius (shell-to-signature domain average distance) r 504 must be corrected to take account of the part 514 of the measurement noise projected onto the signature domain 501. In the simplest case of realization noise described by a Laplace-Gauss distribution centered with the same amplitude for all dimensions, the radius length correction can be written as $$r_L = r_{L=0} \times \sqrt{\frac{N-L}{N}} \tag{62}$$

where $r_{L=0}$ corresponds to the $r_i$ (eq. 6) for a given operating condition set. In that case, the distance r 504=$r_L$ corresponds to the distance between the shell center 508 and the signature manifold 501 as illustrated in FIG. 19.

An aspect of the method of the invention is that it maps the measurement domain like a shell manifold enveloping a signature manifold. In this vision, the measurements are elements of a hollow cloud whereas in classical statistics, in contrast, measurements appear inside the cloud. In classical statistics, the characteristic distances of the measurement density probability function are the distances of the measurements with respect to a signature manifold. In the proposed method, the characteristic distances of the measurement density probability function 516 are the distances 512 of the signal related measurements with respect to a shell manifold 502 located around a signature manifold 501. In the case of numerous dimensions N, a Laplace-Gauss function can be used and the distances 512 of the signal related measurements 103 are with respect to a shell manifold center 508.

Hollow clouds of realizations involve an adaptation of several mathematical tools. For example, the Gaussian mixture model (GMM) is a tool to be adapted to hollow clouds. Used in various algorithms, the kernel trick is also subjected to an adaptation. Indeed, the Gaussian kernel $$K(x, y) = \exp\left(-\frac{\|x-y\|^2}{2\sigma^2}\right) \quad (63)$$

between two input vectors x and y refers to a centered Laplace-Gauss dispersion $N(0, \sigma^2)$. With the method of the invention, the average distance between two realizations x and y in $\mathbb{R}^N$ has a $\sqrt{r_x^2+r_y^2}$ magnitude, that is the root mean square of the magnitudes of the noise vectors in $\mathbb{R}^N$. The magnitude of the average noise vector r may be given by equation 6a when there is a signature mapped to the input vector or estimated otherwise. With the method of the invention, the kernel $$K(x, y) = \exp\left(-\frac{(\|x-y\| - (r_x^2 + r_y^2)^{1/2})^2}{2(\sigma_{rx}^2 + \sigma_{ry}^2)}\right) \quad (64)$$

corresponds to a non-centered Laplace-Gauss dispersion $N(\sqrt{r_x^2+r_y^2}, \sqrt{\sigma_{rx}^2+\sigma_{ry}^2})$ where $\sigma_{rx}$ and $\sigma_{ry}$ correspond to the dispersion of the noise vectors $r_x$ and $r_y$. Likewise, as a first approximation is the kernel $$K(x, y) = \exp\left(-\frac{(\|x-y\| - r_x)^2}{2\sigma_{rx}^2}\right) \quad (65)$$

for the comparison between a realization x and a signature y. A more accurate value $$K(x, y) = \exp\left(-\frac{k^2}{2}\right) \quad (66)$$

is obtained from the $k^2$ factor given at equation 19a. If the $k^2$ factor given at equation 30 is inserted into the previous equation, the kernel for x and y inputs corresponding to signatures (or local averages of realizations) is obtained.

The kernel trick is used in statistics and in machine learning. In the principal component analysis (PCA), the covariance matrix is impacted by the method of the invention as well as the kernel trick. The support vector machines (SVMs) frequently use the Gaussian kernel to be adapted for hollow clouds as described above. The hollow cloud concept doubly impacts the linear discriminant analysis (LDA): the multivariate normal distribution and the Gaussian kernel used are affected.

While embodiments of the invention have been illustrated in the accompanying drawings and described above, it will be evident to those skilled in the art that modifications may be made therein without departing from the invention.

Appendix 1—Merging Dimensions

Given a set of M measurements of N dimensions separated in two measurement sets comprising respectively $N_1$ and $N_2$ dimensions with $N=N_1+N_2$, since the dimensions share a same engineering unit, they can be mixed and shared.

The square distance of the sets can be added $$D_{m,i}^2 = \sum_{n=1}^{N}(X_{m,n} - S'_{i,n})^2 = \quad (A1\text{-}1)$$

$$\sum_{n=1}^{N_1}(X_{m,n} - S'_{i,n})^2 + \sum_{n=1+N_1}^{N_1+N_2}(X_{m,n} - S'_{i,n})^2 = D_{m,i,1}^2 + D_{m,i,2}^2$$

The square radius of the sets can be added $$r_i^2 = \frac{1}{M}\sum_{m=1}^{M}\sum_{n=1}^{N}(X_{m,n} - S'_{i,n})^2 = \quad (A1\text{-}2)$$

$$\frac{1}{M}\sum_{m=1}^{M}\left(\sum_{n=1}^{N_1}(X_{m,n} - S'_{i,n})^2 + \sum_{n=1+N_1}^{N_1+N_2}(X_{m,n} - S'_{i,n})^2\right)$$

$$= \frac{1}{M}\sum_{m=1}^{M}\left(\sum_{n=1}^{N_1}(X_{m,n} - S'_{i,n})^2\right) + \quad (A1\text{-}3)$$

$$\frac{1}{M}\sum_{m=1}^{M}\left(\sum_{n=1+N_1}^{N_1+N_2}(X_{m,n} - S'_{i,n})^2\right) = r_{i,1}^2 + r_{i,2}^2$$

The square addition is also applicable to signature dispersion $$(\sigma_i^s)^2 = \frac{1}{M-1} \cdot r_i^2 = \frac{1}{M-1} \cdot (r_{i,1}^2 + r_{i,2}^2) = (\sigma_{i,1}^s)^2 + (\sigma_{i,2}^s)^2 \quad (A1\text{-}4)$$

But the square addition is not true for hypersphere shell dispersion (hardness)

$$(\sigma_i^r)^2 = \frac{1}{M}\sum_{m=1}^{M}\frac{1}{N}\sum_{n=1}^{N}(X_{m,n} - S'_{i,n})^2 = \quad (A1\text{-}5)$$

$$\frac{1}{N} \cdot \frac{1}{M}\sum_{m=1}^{M}\sum_{n=1}^{N}(X_{m,n} - S'_{i,n})^2 = \frac{1}{N} \cdot r_i^2$$

$$= \frac{1}{N} \cdot (r_{i,1}^2 + r_{i,2}^2) = \quad (A2\text{-}6)$$

$$\frac{1}{N} \cdot (N_1(\sigma_{i,1}^r)^2 + N_2(\sigma_{i,2}^r)^2) = \frac{N_1}{N} \cdot (\sigma_{i,1}^r)^2 + \frac{N_2}{N} \cdot (\sigma_{i,2}^r)^2$$

and is also not true for square deviation $$(D_{m,i}-r_i)^2 \leq (D_{m,i,1}r_1)^2 + (D_{m,i,2}r_2)^2 \quad (A1\text{-}7)$$

Comparing $$k^2 = \frac{(D_{m,i} - r_i)^2}{(\sigma_i^{X-S})^2} = \left(\frac{D_{m,i}}{r_i} - 1\right)^2 / \left(\frac{1}{N(M-1)} + \frac{1}{N}\right) \quad (A1\text{-}8)$$

with $$k^2 = \frac{1}{L}\sum_{l=1}^{L}\left(\frac{HMD_l}{\sigma_i^{X-S}}\right)^2 = \frac{1}{L}\sum_{l=1}^{L}k_l^2 \quad (A1\text{-}9)$$

the k value obtained for merged measurements with eq. A1-8 is not equal to the proposed estimation with eq. A1-9: both numerator (see inequality A1-7) and denominator (if $N_1 \neq N_2$) work for the divergence. These values are close when the number of dimensions is similar and when the deviation to real signature is uniformly distributed between samples.

In respect with signature-to-signature comparison, eq. A1-1 demonstrates that the eq. 28 used to combine the k factor for signatures separated into two sets $$k^2 = \frac{D_{m,i}^2}{(\sigma_i^s)^2 + (\sigma_j^s)^2} \approx \frac{D_{m,i,1}^2}{(\sigma_{i,1}^s)^2 + (\sigma_{j,2}^s)^2} + \frac{D_{m,i,2}^2}{(\sigma_{i,1}^s)^2 + (\sigma_{j,2}^s)^2} \quad \text{(A1-10)}$$

can yield an accurate result when the separated signatures show similar standard deviation. From eq. 9

$$\sigma_i^s = r_i \cdot \sqrt{\frac{1}{M-1}}$$

the signature dispersion appears similar if the hypersphere radius are similar. Since hypersphere radius is noise by the square root of the number of dimensions N, the merging of the k factor using eq. 30 for pieces of signatures having similar dimensionality appears accurate.

In conclusion, eq. 20 and eq. 30 are not exact formulations to combine k values. They are useful approximations showing an error increasing with the discrepancies between the number of merged dimensions. They are especially useful to combine measurement sets having different engineering units.

Appendix 2—Internal Error Included in Signature Radius

Including the internal error in the signature radius as $$(r_i^{S\varepsilon})^2 = (r_i^S)^2 + (\varepsilon_i^s)^2 = r_i^2 \cdot \frac{1}{M} + r_i^2 \cdot \frac{1}{M(M-1)} = r_i^2 \cdot \frac{1}{(M-1)} \quad \text{(A-1)}$$

with $$(r_{i,j}^{S\varepsilon})^2 = (r_i^{S\varepsilon})^2 + (r_j^{S\varepsilon})^2 \quad \text{(A-2)}$$

the hypershere signature deviation (HSD) becomes $$\text{HSD}_{i,j} D_{i,j} - r_{i,j}^{S\varepsilon}. \quad (26)$$

The invention claimed is:

1. A computerized method of detecting a high voltage partial discharge signal in an underground vault, comprising: measuring voltage in the underground vault by moving a partial discharge sensor back and forth in the underground vault; producing an estimated partial discharge signature typifying a characteristic feature of voltage measurements in the underground vault related to the partial discharge signal; determining multidimensional statistics on the voltage measurements in a multidimensional space with respect to the estimated partial discharge signature; and quantifying matching likelihoods of the voltage measurements in the underground vault based on distances of the voltage measurements with respect to a shell manifold derived from the multidimensional statistics and enveloping a signature manifold in the multidimensional space; and a processor externally reporting presence of a high voltage discharge signal in the underground vault in response to detecting the high voltage partial discharge signal in the underground vault.

2. The method according to claim 1, wherein the signature manifold is defined by an estimated signature which corresponds to:
   a point of the multidimensional space when the estimated signature is invariable with respect to one or more conditions measured in the signal related measurements, in which case the shell manifold resembles a hypersphere shell; and
   a domain of the multidimensional space when the estimated signature changes with respect to one or more conditions measured in the signal related measurements, in which case the shell manifold resembles a structure enveloping the domain and having a dimension corresponding to a density probability function of a realization in the multidimensional space.

3. The method according to claim 1, wherein the multidimensional statistics on the signal related measurements comprise shell-to-signature manifold average distance, standard deviation and dispersion of dispersion data with respect to the signature manifold in the multidimensional space.

4. The method according to claim 3, wherein, in the multidimensional statistics on the voltage measurements and for a given condition set:
   the average distance data are defined as $$r_i = \frac{1}{M} \sum_{m=1}^{M} \sqrt{\sum_{n=1}^{N} (X_{m,n} - S'_{i,n})^2} \text{ or}$$

$$r_i = \sqrt{\frac{1}{M} \sum_{m=1}^{M} \sum_{n=1}^{N} (X_{m,n} - S'_{i,n})^2}$$

for $X_m \in$ cluster i, where $S'_{i,n}$ is a closest point of the estimated partial discharge signature with respect to $X_{m,n}$, N represents a number of dimensions related to a representation form of the voltage measurements, M represents a number of voltage measurements X, and S' represents the estimated partial discharge signature produced in relation with a cluster i to which the voltage measurements belong;
   the standard deviation data are defined as $$\sigma_i^r = \sqrt{\frac{1}{M} \sum_{m=1}^{M} \left( r_i - \sqrt{\sum_{n=1}^{N} (X_{m,n} - S_{i,n})^2} \right)^2}$$

or, for Gaussian noise assumption in the voltage measurements, $$\sigma_i^r = r_i \cdot \sqrt{\frac{1}{2N}};$$

the dispersion of dispersion data are defined as $$(\sigma_i'^r)^2 = \frac{\sigma_i'^2}{M-1}$$

or, for Gaussian noise assumption in the voltage measurements, $$\sigma_i'^r = r_i \cdot \sqrt{\frac{1}{2N \cdot (M-1)}};$$

and the multidimensional statistics on the voltage measurements further comprise estimated average distance bias error data defined as $$\varepsilon_i^S = r_i \cdot \sqrt{\frac{1}{M(M-1)}}, M > 1.$$

5. The method according to claim 1, wherein the estimated partial discharge signature is estimated from the voltage measurements using an averaging function.

6. The method according to claim 5, wherein the estimated partial discharge signature is estimated from the voltage measurements using a moving averaging function, the method further comprising:
comparing a last one of the voltage measurements with a corresponding moving average resulting from the moving averaging function;
comparing the moving average with a predetermined reference signature; and
determining a measurement trending based on comparison results from the steps of comparing.

7. The method according to claim 6, further comprising:
computing an average distance deviation corresponding to a distance between the last one of the voltage measurements and the shell manifold;
computing a total dispersion of the voltage measurements;
computing a density probability function based on the average distance deviation with respect to the total dispersion, the measurement trending being determined according to the density probability function.

8. The method according to claim 7, further comprising:
producing a warning signal when a predetermined feature of the last one of the voltage measurements exceeds k times a standard deviation of measurements dispersion around the shell manifold.

9. The method according to claim 1, wherein the estimated partial discharge signature has evolution steps according to the voltage measurements from which the estimated partial discharge signature is derived, the method further comprising:
computing multidimensional statistics on the estimated partial discharge signature at the evolution steps in the multidimensional space; and
comparing the estimated partial discharge signature at different ones of the evolution steps using the multidimensional statistics on the estimated partial discharge signature to determine a trend.

10. The method according to claim 9, further comprising:
determining a signature trending from the multidimensional statistics on the estimated partial discharge signature; and
when the signature trending has a deviation exceeding a preset threshold, performing pattern recognitions for the estimated partial discharge signature with respect to a set of signatures stored in a database and indicative of predetermined conditions.

11. The method according to claim 10, wherein the multidimensional statistics on the estimated partial discharge signature at the evolution steps comprise average distance, dispersion and internal error data.

12. The method according to claim 11, further comprising:
computing a signature deviation based on a distance between the estimated partial discharge signature at two of the evolution steps with respect to a signature shell manifold resulting from multidimensional statistics on differences of the estimated partial discharge signature at different couples of the evolution steps;
computing a density probability function based on the signature deviation; and
determining a signature trending according to the density probability function.

13. The method according to claim 12, further comprising:
producing a warning signal when the signature deviation with respect to a signature-to-signature total dispersion exceeds a preset signature deviation value.

14. The method according to claim 12, further comprising:
merging a probability of L signature-to-signature comparisons using a k factor defined as $$k^2 = \frac{1}{L} \sum_{l=1}^{L} \left( \frac{HSD_l}{\sigma_l^{S-S}} \right)^2 = \frac{1}{L} \sum_{l=1}^{L} k_l^2$$

wherein $HSD_l$ represents the signature deviation.

15. The method according to claim 1, wherein the voltage measurements are formed of signal measurements normalized as function of a predetermined noise amplitude normalization metric.

16. The method according to claim 1, further comprising:
producing a set of estimated partial discharge signatures typifying characteristic features of sets of the voltage measurements; and
determining membership likelihoods of the voltage measurements for the set of estimated partial discharge signatures based on distances of the estimated partial discharge signatures with respect to shell manifolds derived from the multidimensional statistics and located around the voltage measurements.

17. The method according to claim 1, wherein the voltage measurements are formed of averages of signal measurements split into sets.

18. The method according to claim 1, wherein the estimated partial discharge signature is estimated from signal measurements in respect with a first apparatus similar to a second apparatus from which the voltage measurements derive and having similar operating conditions.

19. The method according to claim 1, further comprising:
determining a measurement trending from the multidimensional statistics on the voltage measurements; and
when the measurement trending has a deviation to the estimated partial discharge signature exceeding a preset threshold, performing pattern recognitions for the estimated partial discharge signature with respect to a set of signatures stored in a database and indicative of predetermined conditions.

20. The method according to claim 1, further comprising:
estimating a covariance matrix with the voltage measurements;

computing multidimensional statistics on the covariance matrix in a multidimensional space of N×N dimensions where N is a dimensionality of the estimated partial discharge signature; and quantifying matching likelihoods of the voltage measurements also based on distances of cross-measurement matrices with respect to the estimated covariance matrix.

21. The method according to claim 1, further comprising:

krigging the signal related measurements to build the signature manifold.

22. The method according to claim 1, further comprising:

moving a sensor in a vicinity of a dielectric defect.

23. A system for detecting a high voltage partial discharge signal in an underground vault, comprising:

a partial discharge sensor that measure voltage by moving the partial discharge sensor back and forth in the underground vault;

a measuring arrangement that includes the partial discharge sensor and is connectable to the high voltage electrical equipment, the measuring arrangement measuring one or more predetermined operating parameters of the high voltage electrical equipment to produce voltage measurements thereof;

a memory having a statistics database;

a processor connected to the measuring arrangement and the memory, the processor being configured to process the voltage measurements, produce multidimensional statistics on the voltage measurements and an estimated partial discharge signature typifying a characteristic feature of the voltage measurements, updating the statistics database with the voltage measurements and the multidimensional statistics, and produce diagnosis data indicative of the operating condition of the high voltage electrical equipment as function of matching likelihoods of the voltage measurements quantified based on distances of the voltage measurements with respect to a shell manifold derived from the multidimensional statistics and enveloping a signature manifold in the multidimensional space; and an output unit connected to the processor for externally reporting the diagnosis data.

24. The system according to claim 23, further comprising:

a communication unit connected to the processor and the memory and connectable to a communication link with at least one like system monitoring a like apparatus for exchanging data therewith.

25. The system according to claim 23, further comprising:

a control unit connected to the processor and the measuring arrangement and connectable to the high voltage electrical equipment for producing control signals for the high voltage electrical equipment as function of control data produced by the processor based on the diagnosis data.

26. The system according to claim 23, wherein the processor has a signature statistics module computing the multidimensional statistics on the estimated partial discharge signature from the signal related measurements, a measurement statistics module computing the multidimensional statistics on the voltage measurements from the voltage measurements, a measurement trending module performing measurement trending from the multidimensional statistics computed by the signature and measurement statistics modules, and a statistics database management module managing the statistics database from the multidimensional statistics computed by the signature and measurement statistics modules.

27. The system according to claim 26, wherein the processor further has a measurement trending or pattern recognition module performing measurement trending or pattern recognition from the multidimensional statistics computed by the measurement statistics module and the multidimensional statistics on the estimated partial discharge signature from the statistic database management module, and a signature trending or pattern recognition module performing signature trending or pattern recognition from the multidimensional statistics computed by the signature statistics module and the multidimensional statistics on the estimated partial discharge signature from the statistics database management module.

28. The system according to claim 27, wherein the diagnosis data comprise alarm state data derived from the measurement trending, the measurement trending or pattern recognition and the signature trending or pattern recognition modules, indicative of an abnormal operating state of the apparatus.

29. The system according to claim 23, wherein a sensor is moved in a vicinity of a dielectric defect.

* * * * *